(12) United States Patent
Chan et al.

(10) Patent No.: US 11,821,979 B2
(45) Date of Patent: Nov. 21, 2023

(54) GLOBAL INTEGRITY CHECK SYSTEM AND ASSOCIATED METHOD

(71) Applicants: Hian Lim Chan, Singapore (SG); Marc Lesturgie, Palaiseau (FR); OFFICE NATIONAL D'ETUDES ET DE RECHERCHES AEROSPAT, Palaiseau (FR)

(72) Inventors: Hian Lim Chan, Singapore (SG); Marc Lesturgie, Palaiseau (FR); Azarian Sylvain, Palaiseau (FR)

( * ) Notice: Subject to any disclaimer, the term of this patent is extended or adjusted under 35 U.S.C. 154(b) by 800 days.

(21) Appl. No.: 16/496,769

(22) PCT Filed: Mar. 21, 2018

(86) PCT No.: PCT/SG2018/050125
§ 371 (c)(1),
(2) Date: Oct. 12, 2020

(87) PCT Pub. No.: WO2018/174822
PCT Pub. Date: Sep. 27, 2018

(65) Prior Publication Data
US 2021/0116558 A1    Apr. 22, 2021

(30) Foreign Application Priority Data
Mar. 22, 2017 (SG) .............................. 10201702321P

(51) Int. Cl.
*G01S 13/87* (2006.01)
*G01S 13/933* (2020.01)
(Continued)

(52) U.S. Cl.
CPC .............. *G01S 13/872* (2013.01); *G01S 7/40* (2013.01); *G01S 13/003* (2013.01);
(Continued)

(58) Field of Classification Search
CPC ........ G01S 13/872; G01S 7/40; G01S 13/003; G01S 13/765; G01S 13/933; G01S 13/90;
(Continued)

(56) References Cited

U.S. PATENT DOCUMENTS

2007/0200761 A1* 8/2007 Smith ..................... G01S 13/86
342/461
2007/0252760 A1* 11/2007 Smith ..................... G01S 11/02
342/451
(Continued)

FOREIGN PATENT DOCUMENTS

| CN | 105699943 A | 6/2016 | |
|---|---|---|---|
| EP | 2610636 * | 3/2013 | ............ G01S 13/72 |
| EP | 2610636 A1 | 3/2013 | |

*Primary Examiner* — Donald H B Braswell
(74) *Attorney, Agent, or Firm* — Ashkan Najafi

(57) ABSTRACT

A system to acquire and track vehicles travelling in airspace, sea and land via a constellation of satellites. The system includes: (a) means for detecting a first signal from a vehicle; (b) a process for detecting anomaly from the first signal and determining whether it occurs inside or outside a first radar mode coverage area; (c) means for detecting a second signal from the vehicle under a first radar mode if the anomaly occurs inside its coverage area; (d) means for detecting a third signal from the vehicle under a second radar mode if the anomaly occurs outside the first radar mode coverage area; and (e) means for (i) refining the second or third signal from the vehicle under a third radar mode, such that the first, second, third and fourth detecting means are sequentially activated to detect the first, second and third signals by each satellite.

47 Claims, 14 Drawing Sheets

(51) Int. Cl.
  *G01S 7/40*      (2006.01)
  *G01S 13/00*     (2006.01)
  *G08G 7/00*      (2006.01)
  *G01S 13/76*     (2006.01)
  *G01S 13/90*     (2006.01)

(52) U.S. Cl.
  CPC .......... *G01S 13/765* (2013.01); *G01S 13/933* (2020.01); *G08G 7/00* (2013.01); *G01S 13/90* (2013.01)

(58) Field of Classification Search
  CPC .......... G08G 7/00; G08G 3/00; G08G 5/0026; G08G 5/0082
  See application file for complete search history.

(56) References Cited

U.S. PATENT DOCUMENTS

| | | | |
|---|---|---|---|
| 2009/0009395 A9 | 1/2009 | Smith et al. | |
| 2010/0013700 A1* | 1/2010 | Chiassarini | G01S 13/90 342/25 F |
| 2014/0180566 A1* | 6/2014 | Malhotra | G08G 3/02 340/984 |
| 2016/0155342 A1* | 6/2016 | Gibson | G08G 5/0021 701/409 |
| 2018/0172823 A1* | 6/2018 | Tyc | G01S 13/9056 |
| 2020/0003894 A1* | 1/2020 | Giancristofaro | G01S 13/90 |

* cited by examiner

GLOBAL INTEGRITY CHECK SYSTEM AND ASSOCIATED METHOD

FIELD OF THE INVENTION

The present disclosure relates to global spaceborne systems, and more particularly, to a satellite system for detecting anomalies such as falsification or interruption of vehicle transponder signals in airspace, sea and on land. The system and method operates in a cooperative, semi-cooperative and non-cooperative environment and provides permanent surveillance, tracking and positioning of mobile vehicles in airspace, sea and on land. The system can further operate in locations that may or may not be covered by current air, sea or ground traffic control surveillance and tracking systems.

BACKGROUND

ADS-B and AIS are universally used and adopted in air and maritime traffic control and rely on the decoding of transmitted signals to obtain their locations while moving through airspace or sea lanes. The ADS-B and AIS are further known as cooperative systems and utilize transponders carried by vehicles such as aircraft or ships. ADS-B and AIS rely on data transmitted by aircraft and ships and can suffer from spoofing or falsification in relation to a deliberate action from hostile third parties, such as falsification, interruption or destruction of the transponders, as possibly in the case of the Malaysian Airlines Flight MH370 disappearance.

A secondary surveillance radar (SSR) is utilized in air traffic control (ATC), that not only detects and measures the positioning of aircraft including range and bearing, but also requests additional information from the aircraft such as its identity and altitude. Unlike primary radar systems that measure only the range and bearing of targets by detecting reflected radio signals, SSR relies on targets equipped with a radar transponder that replies to each interrogation signal by transmitting a response containing encoded data. Monopulse secondary surveillance radar (MSSR), Mode S, TCAS and ADS-B are examples of modern methods of secondary surveillance in ATC operations.

When an aircraft equipped with such a transponder is present within the secondary surveillance radar coverage, a Mode-S protocol for example is activated from a first interrogation by the SSR. The position of the aircraft is sent to the SSR (and to any of the ADS-B receivers present in the line of sight area) with a period which corresponds to the scan period of the radar. However, if the aircraft is outside the SSR coverage, the transponder transmits the position every second but not in a bi-directional mode. This is the case when an aircraft flies over oceans that are more than 300 km away from a land mass. This is especially important when the vehicles are operating in remote areas which are not covered by interrogating radars. Although countries are looking at solutions for creating a flight-tracking system that can ensure complete surveillance of global airspace and avoid incidences such as the disappearance of the MH370, current solutions are limited to cooperative tracking using satellites to receive the transponder signals from aircrafts that have active transponders and assuming that the transponders are not switch off or are not spoofed. Similarly, cooperative tracking system for maritime ships exists via the use of AIS, which also assumes that the transponders are not switch off or are not spoofed.

Such or equivalent surveillance applications can also be utilized in road traffic systems. For example, long haul trucks or expensive land vehicles may in the near future employ GPS and/or transponder technologies. These surveillance applications may be useful for services such as electronic payments, processing of insurance premiums or to facilitate court/police investigations. The above scenario can be extended to any cooperative systems which uses modulated radio waves for transmission, i.e. providing the coding/modulation scheme as in the case for the ADS-B and AIS. However, with the increase and generalization of smart sensors in our day-to-day life, smarter cyberattacks or other human criminal methods that can cause malfunctions to cooperative systems (including a switch-off) will appear as new threats. Currently there are no global systems capable of overcoming any of such types of attacks, when such new transponders enter into our routine life. In addition, there are no anti-spoofing or anti-switch off mechanisms in place to overcome these attacks even when a transponder is present.

Accordingly, a need remains for a system to overcome the aforementioned shortcomings. The exemplary embodiment(s) of this disclosure provides a Global Integrity Check System (GICS) for (i) verifying the integrity of traffic control data and detection of anomalies in locations that cannot be covered by current traffic control surveillance and tracking systems and (ii) providing permanent surveillance, tracking and positioning of mobile vehicles including ships, aircraft, cars, future robotics or platforms equipped with a transponder or equivalent/similar device. The GICS can further operate globally in locations that may or may not be covered by current air, sea and ground traffic control surveillance and tracking systems.

SUMMARY

In view of the foregoing background, it is therefore an object of the non-limiting exemplary embodiments of this disclosure to provide a satellite system to alleviate the aforementioned shortcomings by a combination of cooperative, semi-cooperative and non-cooperative techniques, and optimizing a small constellation of satellites for verifying the integrity of traffic control data and detection of anomalies of aircrafts, ships and land vehicles in locations that may or may not be covered by current traffic control surveillance and tracking systems. Such a satellite system can provide permanent non-cooperative surveillance, tracking and positioning of distress vehicles (including suspicious vehicles) such as aircrafts, ships, land vehicles, future robotics or platforms equipped with a transponder device. The GICS can further operate globally in locations that cannot be covered by current air, sea and ground traffic control surveillance and tracking systems.

In accordance with one aspect of the invention, a system is disclosed for acquiring, positioning and tracking of vehicles travelling in airspace, sea and land routes via a constellation of small satellites. The system may include: (a) a first detecting means for detecting a first signal from a vehicle travelling along a vehicle travel path; (b) a processing means for detecting an anomaly from the first signal and determining whether the anomaly occurs (i) inside a first radar mode coverage area or (ii) outside the first radar mode coverage area; (c) a second detecting means for detecting a second signal from the vehicle under a first radar mode if the anomaly occurs inside the first radar mode coverage area; (d) a third detecting means for detecting a third signal from the vehicle under a second radar mode if the anomaly occurs outside the first radar mode coverage area; and (e) a fourth detecting means for (i) refining the second signal or (ii) refining the third signal from the vehicle under a third radar mode, such that the first, second, third and fourth detecting means are sequentially activated to detect the first, second and third signals by each satellite in the constellation of small satellites.

The constellation of small satellites may include at least three satellites comprising Nano-Satellites, Micro-Satellites, and/or Mini-Satellites. Each satellite may further include: (i) A wideband receiver for receiving electromagnetic (EM) waves and/or signals from either (i) transponder signals from the vehicles, or (ii) Bistatic echo signals reflected off the vehicles; (ii) A low frequency wide swath radar with a transceiver operating in the low frequency band of either HF, VHF or UHF for detecting a distressed vehicle when it has moved randomly from a last known position; (iii) A high resolution Microwave Imaging Radar with a transceiver operating in the X-band microwave frequency for refining the positioning of the distressed vehicle using imaging functions; (iv) A storage/buffer unit for transmitting vehicle information from each satellite to a master ground station, for example, directly or via a geo-sat com service; (v) A synchronization unit (time/frequency) for synchronizing of three radar modes; and (vi) A processor for operational control of the functional units and processing of information such as detecting first, second and third signals from the initial detection, decoding and verification of anomaly, first, second, third and fourth detecting means, as well as performing the vehicle imagery and distress/emergency classifications.

The first detection means may include an Automatic Dependent Surveillance-Broadcast (ADS-B) or an Automatic Identification System (AIS) operating in a cooperative system environment. The processing means may include the processor for decoding and checking the integrity of the first signal. The second detection means may include a Low Frequency Wide Swath Radar for detecting the second signal if the anomaly occurs inside the first radar mode coverage area. The second detection means may include a Passive Coherent Bistatic Radar for detecting the third signal reflected off the vehicle when the vehicle is travelling outside the first radar mode coverage area. The third signal may include bistatic signals transmitted from opportunistic emitters which are reflected of the vehicle outside the first area of the vehicle travel path. The fourth detection means may include a Microwave Imaging Radar for performing high resolution imaging operations in the C, X, Ku or Ka frequency spectrum.

The first signal may further include a unique identification, positioning in x, y, z geographical coordinates, course, and velocity $V_x$, $V_y$, $V_z$ of the vehicle.

The satellite constellation may be in a LEO orbit, wherein the small satellites are organized into three different aspect angles with respect to an area of the vehicle travel path, such that each of the satellite receivers are synchronized in frequency. Each satellite in the constellation may further be deployed to provide a detection ground surveillance coverage gap between neighboring satellites corresponding to a satellite revisit time gap of approximately two minutes. The third signal may further include signals of opportunity from ADS-B operating at 1090+/−3 MHz, AIS operating at 161, 975 to 162,025 MHz, High Frequency Data Link (HFDL), FM Broadcast Emitters operating at 87.5 to 108.0 MHz, VOR/DME Emitters operating at 108 to 117.95 MHz, Geostationary Satellite Emitters and Ground-based and Airborne Radars.

In accordance with one aspect of the invention, a method is disclosed for acquiring, positioning and tracking of vehicles travelling in airspace, sea and land travel routes via a constellation of small satellites. The method may include the steps of: (a) detecting a first signal from a vehicle travelling along a vehicle travel path; (b) detecting an anomaly from the first signal; (c) determining whether the anomaly occurs (i) inside a first radar mode coverage area or (ii) outside the first radar mode coverage area; (d) activating (i) a first radar mode if the anomaly occurs inside the first radar mode coverage area to detect a second signal from the vehicle or (ii) a second radar mode if the anomaly occurs outside the first radar mode coverage area to detect a third signal from the vehicle; (e) cueing a third radar mode by the first and second radar modes to (i) refine the second signal or (ii) refine the third signal from the vehicle, such that the steps of (a), (b), (c), (d) and (e) are sequentially performed by each satellite in the constellation of small satellites. The vehicle may include non-distressed and distressed vehicles, such that the distressed vehicles is/are vehicles detected with an anomaly.

The method may further include sequencing the first, second and third radar modes repeatedly to simultaneously provide surveillance, positioning and tracking of all fast and slow moving vehicles with or without anomalies in the airspace, sea and land travel routes.

The first signal may include a transponder signal utilizing a cooperative technique comprising a ADS-B and/or MS system. The second signal may include a coarse positioning of the vehicle utilizing a non-cooperative technique comprising a Low Frequency Wide Swath Radar. The third signal may include a transponder signal and/or a bistatic signal reflected from the vehicle utilizing a Passive Coherent Radar technique. Further, the second and third signals may include utilizing an active high resolution Microwave Imaging Radar to perform high resolution imaging and tracking of the vehicle. The Microwave Imaging Radar may perform the high resolution imaging operations in the C, X, Ku or Ka frequency spectrum.

The method may include detecting an anomaly from the first signal further including: (a) decoding the first signal; (b) checking the integrity of the first signal; and (c) deriving an outcome by comparing the expected positioning with the measured positioning of the first signal such that the detected anomaly can be sent to the satellite which is closest to the area of the vehicle. The decoding may utilize PPM modulation for ADS-B and GMSK modulation for AIS.

In accordance with one aspect of the invention, activating the first radar mode may include utilizing the Low Frequency Wide Swath Radar with information on anomaly to re-indicate the coarse positioning of the vehicle and activating the second radar mode may include activating a first gap filler mode or a second gap filler mode to detect the vehicle. Activating the first gap filler mode may include activating a Semi-Cooperative Technique to detect the third signal from the vehicle transponder, wherein the third signal is a false transponder signal indicated by the positioning data of the third signal being incoherent with the positioning data detectable from a fourth signal emitted by another onboard sensor from the vehicle and activating the second gap filler mode may include activating the Passive Coherent Radar for receiving the opportunistic bistatic signals, wherein the vehicle transponder is switched off or destroyed.

The Passive Coherent Radar may include (i) a Passive MIMO SAR Imaging Radar configured to detect and locate the vehicle in a MIMO configuration and (ii) a Passive HF Skywave Radar configured to receive the HF signals that bounced off the vehicles when they are illuminated by a global network of sea, land and airborne transmitting stations. The Passive MIMO SAR Imaging Radar may re-utilize ADS-B signals from multiple transmitting vicinity fast vehicles to illuminate the vehicle under tracking to provide the second gap filler mode when the distressed vehicle is outside the first radar mode coverage due to a sparse satellite constellation. The Passive HF Skywave Radar may utilize HF signals at less than 18 MHz emitted from ground based transmitting stations to strike the ionosphere at the F2 layer at a low grazing angle between 10° and 20° and to detect the HF signals reflected from the vehicle at an incidence angle of 20° or less. The ground based transmitting stations may include at least: (i) HF Broadcasting Sites having a typical transmitting power of 500 KW with a transmitting gain of 20 dB, a beamwidth of 20° and a transmitter efficiency of 70%; (ii) Relocatable Transmitting Sites over remote ocean areas such that 500 KW Broadcast HF transmitting systems can be deployed on ships or offshore oil/gas platforms; and (iii) Mobile Transmitting Sites such as the High Frequency Data Link ("HFDL") enabled aircrafts flying in the vicinity for which the reflected vehicle echoes from these illuminations are intercepted by the HF receiving satellite constellation.

The method may further include employing a multilateration technique via a set of at least three satellites orbiting in a non-periodic spacing to check the integrity of the positioning provided by cooperative techniques utilizing a ADS-B or an AIS transponder.

The method may further include halting the first, second and third radar modes sequencing if a distressed vehicle is imaged and activating an emergency sequence by the third radar mode to continuously tracked the distressed vehicle, wherein the distressed vehicle is a vehicle detected with an anomaly.

The third radar mode further includes analyzing motions of a vehicle with anomaly by combining at least one of (i) multiple hypothesis tracking matched to at least one kinematics of the vehicle to obtain an ISAR image of a dived trajectory/vehicle, and (ii) imaging to detect the positioning of a crash point or mid-air explosion of the vehicle by an Inverse SAR imaging technique. The imaging to detect the positioning of a crash point or mid-air explosion of the vehicle comprises may utilize (a) an Inverse Synthetic Aperture Radar (ISAR) imaging process based on the angular and linear motions of the vehicle; (b) Synthetic Aperture Radar imaging (SAR) imaging of the sea and land surfaces for suspicious disappearances such as a crash or an immediate floating debris; and (c) Combination of both the (a) ISAR and (b) SAR techniques.

In accordance with one aspect of the invention, the method may include a second satellite in the constellation that is automatically activated to track and provide positioning of the vehicle under the first and/or third radar modes when the first satellite has moved out of the first radar mode coverage area of the vehicle travel path, wherein the first satellite is automatically de-activated.

In accordance with another aspect of the invention, a method is disclosed for surveillance, integrity check and tracking of vehicles travelling in an airspace, sea and land routes comprising: (a) detecting transponder signals from a plurality of vehicles using cooperative techniques; (b) a first step of checking the transponder signals for anomalies of a vehicle; (c) a second step of detecting a coarse positioning of a distressed vehicle; and (d) a third step of refining the course positioning of the distressed vehicle, wherein the distressed vehicle is further tracked for search and rescue operations.

The first step may include: (a) decoding the transponder signals; (b) checking the integrity of the transponder signals using a multilateration technique; and (c) detecting an anomaly from the transponder signals, wherein a vehicle with an anomaly is a vehicle in distress. Checking the integrity of the transponder signals using a multilateration technique comprising: (a) Implementing Frequency Difference Of Arrival (FDOA) or Time Difference Of Arrival (TDOA) from a set of at least 3 satellites for measuring either differential Doppler frequencies and/or differential time of arrivals of the transponder signals; (b) Computing either differential Doppler frequencies or differential time of arrival or both from the positioning data provided by the cooperative positioning system (transponder under ADS-B or AIS protocol); and (c) Computing the difference between the measurements and the computed values to provide an integrity classification comprising a "True", "False" or "Unclassified" category.

The second step may include detecting the coarse positioning of a distressed vehicle using a Wide Swath Radar if the distressed vehicle is within the Wide Swath Radar coverage. The second step may further include detecting a distressed vehicle using a Passive Coherent Radar if the distressed vehicle is outside the Wide Swath Radar coverage. The second step may further include a first Gap Filler mode for detecting a distressed vehicle with spoofed transponder using a Semi-Cooperative technique and a second Gap Filler mode for detecting a distressed vehicle using (i) MIMO SAR Imaging Radar or (ii) Passive HF Skywave Radar for detecting bistatic signals if the transponder is not detectable.

The third step of refining the coarse positioning of the distressed vehicle may include using a Microwave Radar to further accurately track the distressed vehicle for search and rescue operations.

In accordance with one aspect of the invention, the ground area covered by the (a) first step may range from a diameter of 2000-3000 km of a circumscribed circle based on semi-cooperative mode; (b) second step ranges from a diameter of 1100-1600 km of a circumscribed circle based on a non-cooperative mode; and (c) third step ranges from a diameter of up to 700 km of a circumscribed circle based on a non-cooperative mode).

Advantages of the Global Integrity Check System

The GICS offers the following advantages:

(i) The system provides surveillance, tracking and positioning capabilities for vehicles equipped with cooperative transponder systems such as ADS-B, AIS, IFF (or any other known present and future transponder systems) in a seamless integration with a fully non-cooperative (active and passive) system that operates on a global coverage at high update rates in a seamless process even when the transponders are switched OFF or spoofed. In this way, the cooperative transponder signals are first utilized as an initial cue to the non-cooperative active system to track in remote locations that cannot be covered by the cooperative system;

(ii) The system provides a fully non-cooperative, global tracking system even for vehicles that do not carry any cooperative transponder systems;

(iii) The system supports the simultaneous, non-cooperative global surveillance of air, maritime and ground (land) traffics from the same integrated radar architecture/set-up. This integrated multi-functional configuration offers a compact solution that can potentially fit into a small satellite for cost-effective benefits;

(iv) The system provides global tracking of all fast and slow vehicles using only an optimized minimum number of satellites in the constellation by a unique configuration and sequencing of radar modes within a multi-functional primary space-borne radar unit;

(v) The system facilitates the prediction of hazardous/emergency situations such as the precise location of a crash point or investigating any mid-air explosion behavior using radar imaging technique including Inverse Synthetic Aperture Radar imaging (ISAR) to enable forensic analysis of the distress airliner flight kinematics; and (vi) The system further provides (a) high resolution imaging at a high update rate to allow air traffic controllers to reduce aircraft to aircraft separation distance; and (b) simultaneous multiple signals of the ADS-B, FM Broadcast, GEO satellite emitter with existing cooperative air traffic control data to significantly enhance the overall location accuracy of the tracked vehicles over an airport airspace. This capability advantageously facilitates the reduction in the separation distance between aircrafts to thereby allow scheduling of airport incoming aircrafts at closer intervals to enable tighter packing of flight schedules.

There has thus been outlined, rather broadly, the more important features of this disclosure in order that the detailed description thereof that follows may be better understood, and in order that the present contribution to the art may be better appreciated. There are additional features of this disclosure that will be described hereinafter and which will form the subject matter of the claims appended hereto.

BRIEF DESCRIPTION OF THE DRAWINGS

The novel features believed to be characteristic of the exemplary embodiment(s) are set forth with particularity in the appended claims. The disclosure itself, however, both as to its organization and method of operation, together with further objects and advantages thereof, may best be understood by reference to the following description taken in connection with the accompanying drawings in which:

Figure 1A:
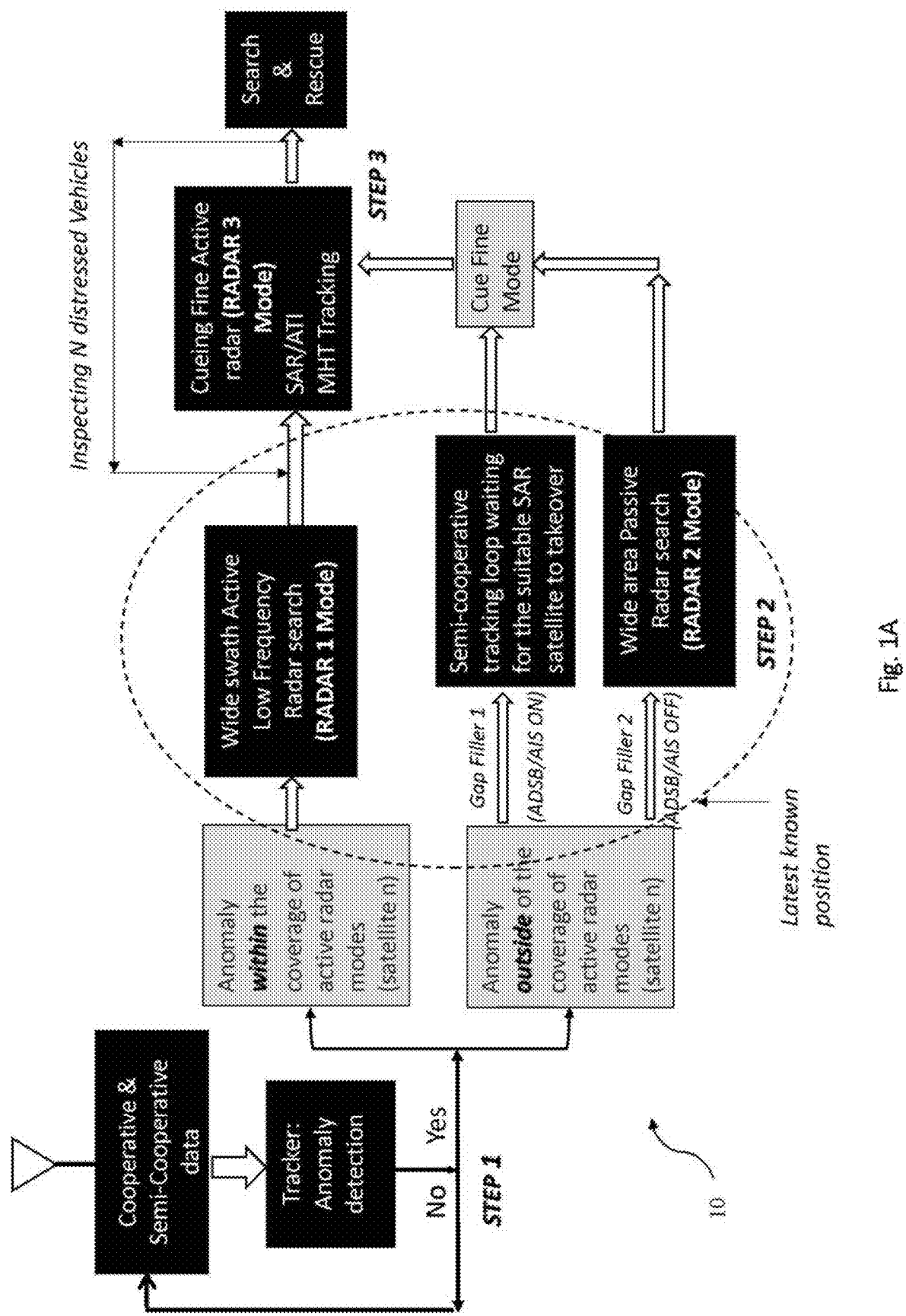
FIG. 1A shows a functional architecture of the GICS in accordance with an exemplary embodiment of the present invention.

Those skilled in the art will appreciate that the figures are not intended to illustrate every embodiment of the invention and this disclosure is not limited to the exemplary embodiments depicted in the figures shown in the figures.

DETAILED DESCRIPTION

In the present disclosure, depiction of a given element or consideration or use of a particular element number in a particular FIG. or a reference thereto in corresponding descriptive material can encompass the same, an equivalent, or an analogous element or element number identified in another FIG. or descriptive material associated therewith. The use of "/" in a FIG. or associated text is understood to mean "and/or" unless otherwise indicated. The recitation of a particular numerical value or value range herein is understood to include or be a recitation of an approximate numerical value or value range, for instance, to within +/−10%, +/−5%, +/−2.5%, or +/−1% of a particular numerical value or value range under consideration.

Definitions of Certain Terms in this Disclosure (i) The term positioning refers to the x (longitude), y (latitude), z (elevation) coordinates of vehicles in relation to geographic coordinates as understood by those with reasonable skill in the relevant art;

(ii) The term vehicle or vehicles refer to one or more than one aircraft, ships or naval vessels, ground or land vehicles, mobile robots and/or any other current and/or future mobile platforms fitted with transponders. The term suspicious or distressed vehicle or vehicles refers to one or more than one vehicles whose transponders exhibit anomalies such as spoofing, falsification of signals or simply switched off from a deliberate action by a third party. The term N number of vehicles refers to one or more than one vehicles under the GICS coverage;

(iii) A phased array antenna comprises multiple elementary antennas which are combined to form a narrow beam and steer the phased array in a given direction;

(iv) The FoV or field of view for an antenna system denotes the maximum sector of visibility of a radar antenna. The FoV area is the area on the ground (earth) covered by the FoV; and (v) Antenna beam footprint is the area on the ground (earth) covered by the main beam of the radar antenna. The footprint can be adjusted within the FoV area.

The definitions expressed hereinabove are meant to clarify certain terms used in this disclosure for ease of understanding and comprehension. Other terms and meanings expressed herein should be well understood by one skilled in the relevant art.

The non-limiting exemplary embodiment(s) will now be described more fully hereinafter with reference to the accompanying drawings. Such exemplary embodiment(s) may, however, be embodied in a variety of configurations and/or arrangements and should not be construed as limited to the embodiment(s) set forth herein. Rather, these embodiment(s) are provided so that this application will be thorough and complete, and will fully convey the true scope of the invention to those skilled in the art.

In various non-limiting exemplary embodiment of the present invention, a Global Integrity Check System (GICS) is disclosed for verifying the integrity of traffic control data and detection of anomalies on vehicles travelling in airspace, sea and land locations that may or may not be covered by traffic control surveillance and tracking systems. The GICS provides permanent cooperative, semi-cooperative and non-cooperative surveillance, tracking and positioning of such vehicles, including suspicious/distressed and/or non-suspicious vehicles that are equipped or not equipped with a transponder device.

For purposes of clarity in this disclosure, the three different techniques currently in use for the global surveillance, tracking and positioning of these vehicles are briefly described herein.

Cooperative Techniques

Cooperative techniques utilize signals transmitted by a transponder carried by the vehicle. A transponder, be it carried on board an aircraft, ship, satellite or land vehicle, is an automated transceiver that emits a coded identifying signal systematically or in response to an interrogating received signal, for example from a Secondary Surveillance Radar (SSR). The visibility of the position (and other requisite data) of such a transponder carrying vehicle relies on the decoding of transmitted transponder signals to obtain the location information. ADS-B and AIS are two examples of universally used cooperative techniques adopted in air and maritime traffic control.

The Automatic Dependent Surveillance-Broadcast (ADS-B) is a cooperative surveillance technology in which an aircraft determines its position via satellite navigation and periodically provides a broadcast, thus enabling the aircraft to be tracked. The transmitted information can be received by air traffic control ground stations as well as received by other aircrafts to provide situational awareness and enable self-separation of the aircrafts thereby avoiding collision with each other. ADS-B is "automatic" as it requires no pilot or external input. It is only "Dependent" in that it depends on data transmitted from the aircraft's navigation system.

The Automatic identification system (AIS) is an automatic tracking system used on ships and by vessel traffic services (VTS) for identifying and locating sea going vessels by electronically exchanging data with nearby ships, MS base stations, and satellites. AIS provides information such as unique identification, position, course, and speed, to assist a vessel's officers and allow maritime authorities to track and monitor marine vessel movements. Marine vessels fitted with an AIS can be tracked by AIS base stations located along coast lines or, when out of range of terrestrial networks, through a growing number of satellites that are fitted with special AIS receivers that are capable of deconflicting a large number of signatures.

However, ADS-B and AIS can suffer from spoofing or falsification of their signals or can simply be switched off from a deliberate action by a hostile or third party, such as possibly in the case of the MH370 disaster.

Semi-Cooperative Techniques

In semi-cooperative systems, signals that are emitted from a vehicle, be it transmitted by the onboard transponder or the onboard surveillance sensors such as the active weather detection radar located in the nose of an aircraft or the active navigation radar on a ship, can be intercepted and received by one or several separate receiving units in a GICS constellation. The signals can be processed (at signal level) to detect and locate the source of the emitted signals. Hence, the positioning of the vehicle can be measured using such semi-cooperative techniques.

However, in the absence of these signals such as fatal failure or destruction of the transponder, surveillance sensors or vehicle, such semi-cooperative techniques may not be efficient.

Non-Cooperative Techniques

In non-cooperative techniques, signals emitted by one or several active deployed sources from a distance will illuminate the vehicle and this illumination is independent from the emissions that originate from the vehicle. The illuminated signals will be scattered off the vehicle, and further processed by one or several receivers: this technology is called primary radar, as it was historically the first radar to exist; primary radar can operate with collocated transmitting and receiving units or in bistatic configuration if the transmitting and receiving units are widely separated. Both configurations aim at detecting and determining the position of any vehicle. In the context of this disclosure the set of active illuminating sources and receivers that determine the vehicle positioning, could be carried on the same or separate systems. Once the positioning of the vehicle is determined independently and non-cooperatively, processing logic can be used to characterize the vehicle status into categories such as hijacking, loss of control, serious failure, disaster and so on.

Currently, a satellite-borne primary radar is universally adopted as a reliable technique for surveillance, positioning and tracking of only slow moving sea or land surface vehicles. Such a satellite active system is commonly known as a Satellite Synthetic Aperture Radar (SAR). However, the design does not support a global, permanent coverage. Moreover, no current satellite-borne active radar exists for the surveillance and tracking of fast airborne vehicles. To perform global and permanent coverage with an acceptable latency in order to engage search & rescue operations, it is likely that the satellite constellations has to be dense, resulting in a solution which is not affordable even for big and well developed countries. Several hundreds to thousands of conventional spaceborne radars may be needed if this approach is utilized.

The above shortcomings of the three different techniques discussed hereinabove for providing global surveillance, positioning and tracking of these vehicles in airspace, sea and land locations are addressed by the present invention which utilizes a constellation of small and cost effective satellites.

GICS Configuration

In an exemplary embodiment of the present disclosure, the GICS 10 is a space-borne satellite system providing permanent 24/7 capabilities for surveillance, positioning and tracking of vehicles 100 (including suspicious vehicles) travelling on commercial air, sea and land routes. Such a space-borne satellite system 10 may include an optimized constellation of small satellites 50 for global surveillance coverage, positioning and tracking of the vehicles 100.

Although this disclosure covers the utilization of a satellite constellation to provide the surveillance, tracking and positioning functions, an individual having ordinary skill in the relevant art will well understand that such a surveillance, positioning and tracking concept may also be performed by non-satellite airborne systems such as, for example, long endurance airships and unmanned air vehicles (UAVs).

FIG. 1A shows the configuration of a small satellite capable of executing a series of steps (STEPs 1, 2 and 3) with respect to three Radar modes (RADAR 1, 2 and 3 Modes) in accordance with an exemplary embodiment of the present invention. The small satellites 50 may include Nano-Satellites, Micro-Satellites or Mini-Satellites which represent a low cost solution for the invention as disclosed. Moreover, the payload of the small satellite constellation can be scalable, i.e. extended to a full Nsat configuration, for example with 40 or 64 satellites as desired. However, for clarity and ease of understanding, the present disclosure explains the GICS 10 with three satellites only.

Figure 1B:
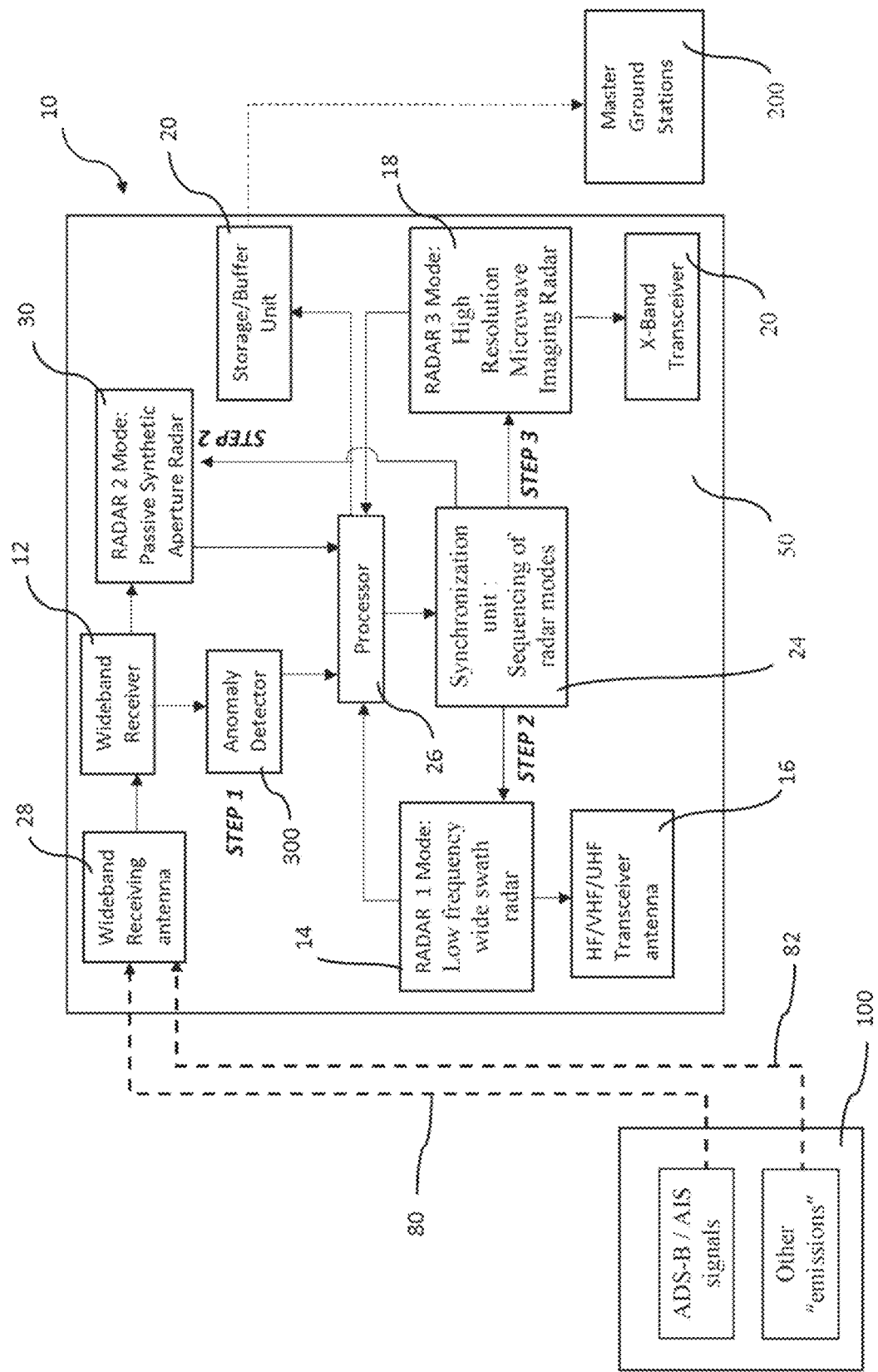
FIG. 1B shows the configuration of a small satellite with respect to the operations of the three Radar modes in accordance with an exemplary embodiment of the present invention.

Each satellite 50 may include at least the following blocks or components as illustrated in FIG. 1B:

(i) A wideband receiver 12 for receiving electromagnetic (EM) waves & signals from either (i) transponder signals 80 (ADS-B and AIS) to check for anomaly of a vehicle 100 travelling in an airspace, sea or land route (STEP 1), or (ii) opportunity bistatic signals 82 to perform RADAR 2 modes;

(ii) A low frequency wide swath radar 14 (RADAR 1 mode) with a transceiver 16 operating in the low frequency band of either HF, VHF or UHF for detecting a "distressed" vehicle 100 when it has moved randomly from its last known position;

(iii) A high resolution Microwave Imaging Radar 18 (RADAR 3 mode) with a transceiver 20 operating in the X-band microwave frequency for refining the positioning of a distressed vehicle 100 using imaging functions;

(iv) A storage/buffer unit 22 for transmitting vehicle information from a satellite 50 to a master ground station 200, for example, directly or via a geo-sat com service;

(v) A synchronization unit 24 (time/frequency) for synchronizing of the three radar modes; and (vi) A processor 26 for operational control of the functional units and processing of information such as detecting signals from the initial detection, decoding and verification of anomaly, RADAR 1, 2 and/or 3 modes, as well as performing the vehicle imagery and distress/emergency classifications.

In one exemplary embodiment, the GICS 10 is configured to include an integrated common antenna 28 for RADAR 1, RADAR 2 and RADAR 3 modes at the system level configuration. Each satellite 50 may carry an integrated Low Frequency+Microwave single antenna such as a two-dimensional UHF band patch array with the X-band antenna array elements inserted into each patch. The integrated common antenna 28 and primary radars offer a compact design that can fit into the class of small satellites such as a Nano-Satellite (1 to 10 kg), Micro-Satellite (10 to 100 kg) or Mini-Satellite (larger than 100 kg) constellations.

In one exemplary embodiment, the GICS 10 may be configured to provide global surveillance, positioning and tracking of all types of fast or slow vehicles 100 globally using a minimum number of satellites 50 in a constellation via the sequencing of three radar modes namely RADAR 1 mode, RADAR 2 mode and RADAR 3 mode.

In one exemplary embodiment, the GICS 10 may be configured to receive ADS-B and/or AIS signals 80 and/or any other types of transponder signals from a plurality of vehicles 100 travelling through airspace, sea and land routes. The vehicles 100 are checked for anomalies by decoding and checking the integrity of the transponder signals 80 transmitted by the vehicles 100 and received by each satellite 50.

Figure 12:
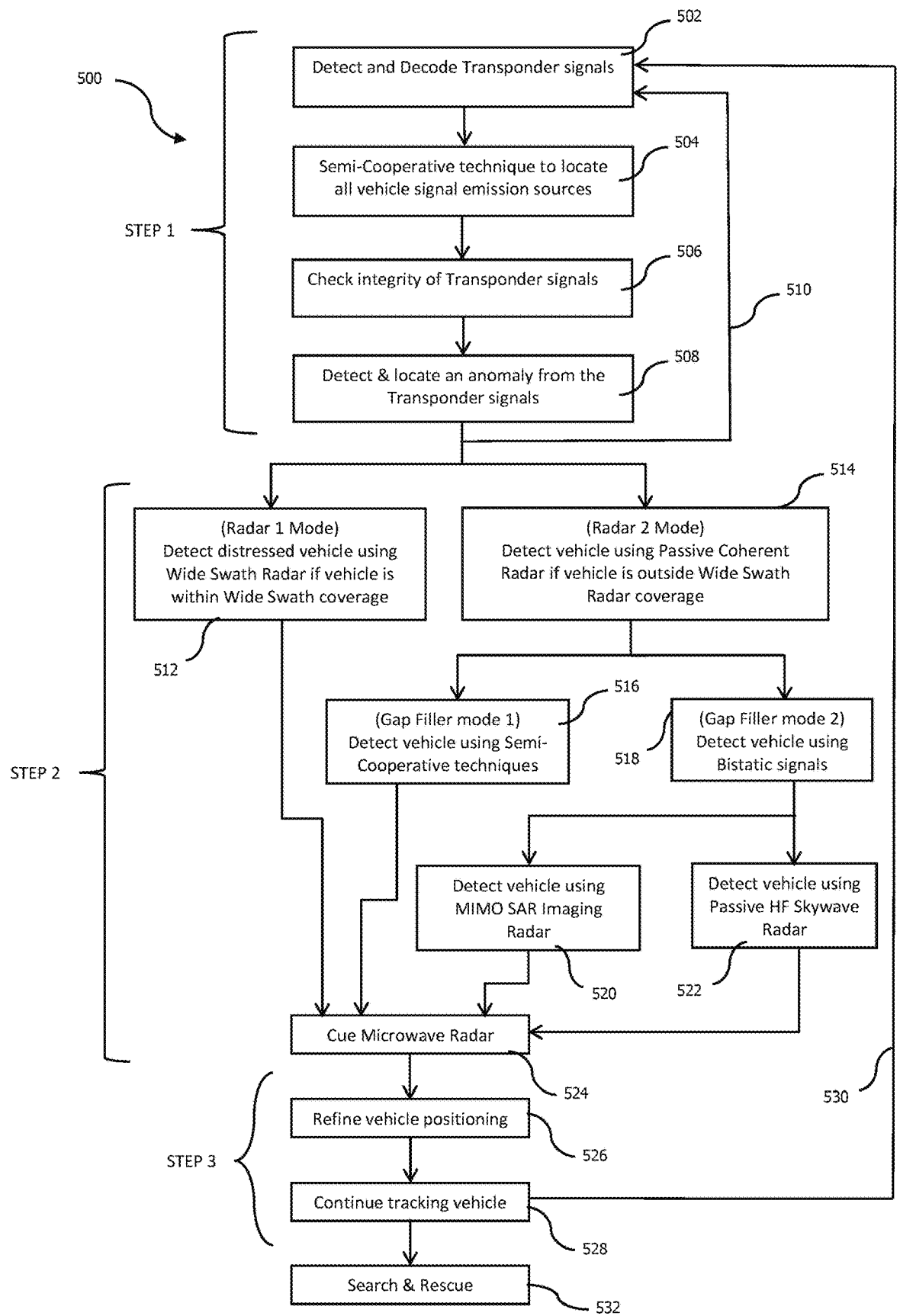
FIG. 12 illustrates the GICS surveillance, detection and tracking method steps leading to search and rescue operations in accordance with the several embodiments of the present invention.

In one exemplary embodiment, a Low frequency wide swath radar 14 (RADAR 1 mode) is activated to map the coarse positions of N number of distress Vehicles 100 (air, sea, and land) with information on anomaly as illustrated in FIGS. 1A and 12. After which RADAR 1 mode will cue RADAR 3 mode to sequentially perform high resolution measurement/imaging of the N number of vehicles 100 for accurate analysis of the vehicles behavior. The sequencing of RADAR 1 and RADAR 3 modes repeats as the satellite moves at very high speed.

In one exemplary embodiment, a Passive Bistatic Coherent Radar (RADAR 2 mode) technique is activated as a gap filler tracking mode to track these distressed vehicles 100 if they move outside of RADAR 1 mode active coverage as shown in FIG. 1A. In order to deploy efficiently an optimized minimum number of satellites in the constellation, coverage gaps from primary active radars may be accepted for a dynamically changing vehicle tracking landscape as well. After which RADAR 2 mode will cue RADAR 3 mode as illustrated in FIGS. 1A and 12. If hazardous or emergency behavior of a particular distress vehicle is imaged and observed under RADAR 3 mode, an emergency sequencing (i.e. search and rescue procedure) will be activated. The GICS 10 will halt the regular RADAR1, RADAR 2 and RADAR 3 modes sequencing and "continuously tracked" distress vehicle under the RADAR 3 mode.

The unique design and sequencing of the three radar modes within a multi-functional satellite unit 50, switching autonomously from a wide swath RADAR 1 mode to a high resolution RADAR 3 mode or alternatively, gap filler RADAR 2 modes to the high resolution RADAR 3 mode respectively provides global surveillance, tracking and accurate positioning of all fast and slow vehicles 100 in the air, sea and land routes.

The Doppler shift for a satellite moving at 7,000 m/s are highly sensitive to the positioning of the vehicles 100. As such, all the satellite receivers 12 in the constellation are synchronized in frequency as this is necessary for measuring a set of meaningful Doppler values.

For the duration of T seconds, each satellite 50 travels a distance 7,000T and by coherently combining the received emitted transponder signals 80 of the vehicle 100 along this physically long flight path to emulate an extremely large virtually synthesized antenna aperture (electronically at signals level such as the Synthetic Aperture Radar SAR technique), it generates an effective aperture (radian) equal to $\theta=\lambda/(7,000T)$. Therefore, the resolution (minimum separation distance between 2 transponder physical positions that can be resolved and discriminated by the synthetic antenna aperture technique) at a distance of 1,000 km is $\delta_{km}=1,000\lambda/7,000T=\lambda/(7T)$ Hence, for a given 3-satellite configuration, the following sensitivity values in the two [x, y] directions are:

(a) Approximately 26 m for ships (T=10 s, frequency 162 MHz); and (b) Approximately 40 m for aircraft (T=1 s, frequency 1090 MHz)

Figure 2:
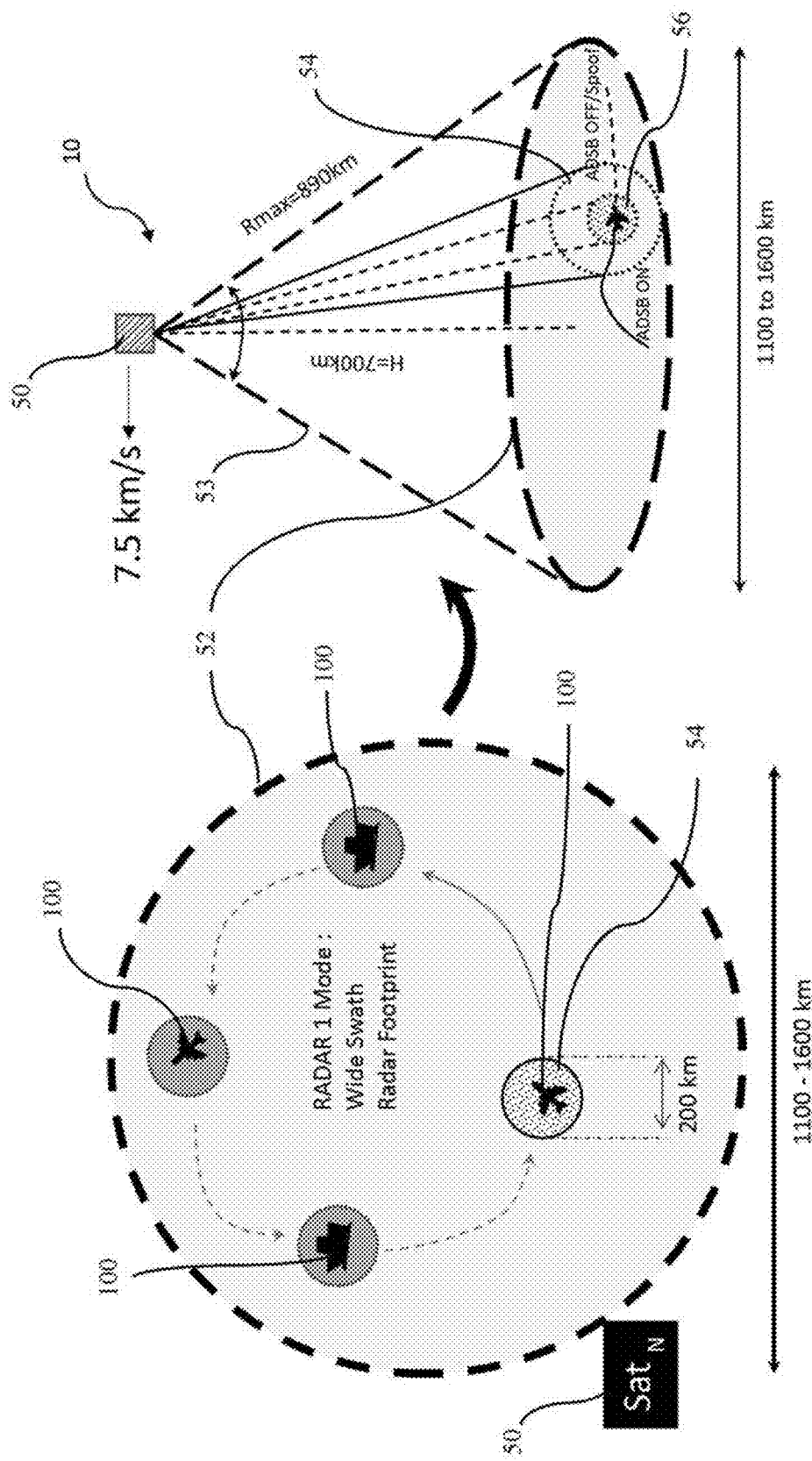
FIG. 2 shows the characteristics of RADAR 1 mode/Wide Swath Low Frequency Radar (WSLFR) configuration illustrating the FoV area and the footprint of the main beam of the WSLFR in relation to the RADAR 3 mode/Microwave Imaging Radar footprint.

FIG. 2 shows the characteristics of RADAR 1 mode/Wide Swath Low Frequency Radar (WSLFR) configuration illustrating the FoV area 52 and the Footprint 54 of the main beam of the WSLFR in relation to the RADAR 3 mode/Microwave Imaging Radar Footprint 56. The large grey shaded disk area represents the FoV area 52 of active non-cooperative detection and tracking. RADAR 1 mode operates in the HF, VHF or UHF spectrum and its instantaneous antenna beam Footprint 54 on the ground may scan an area within a FoV search cone 53 of up to 1600 km diameter. In this way, high speed vehicles 100 such as airliners, will always be in the Line-of-sight (LOS) of the instantaneous beam Footprint 54. RADAR 1 mode may thus be utilized to re-indicate non-cooperatively the coarse location of the distress vehicles 100.

FIGS. 1A and 12 shows the RADAR 2 mode with respect to the GICS 10 configuration in accordance with an exemplary embodiment of the present invention. RADAR 2 mode is a passive coherent radar mode that receive the bistatic echo signals 80, 82 reflected off any vehicles 100 that may be illuminated by any suitable opportunistic emitters available in that surveillance area. RADAR 2 mode may thus be utilized to provide the detection and positioning of the distressed vehicles 100 that are outside the coverage of the active RADAR 1 mode satellite. In addition, RADAR 2 mode may be functional even if the vehicle transponders are switched off intentionally or as a consequence of a catastrophic failure.

FIGS. 1A and 12 illustrates the RADAR 3 mode with respect to the GICS 10 configuration in accordance with an exemplary embodiment of the present invention. RADAR 3 mode performs high resolution imaging to refine the positioning of the distressed vehicles 100 and to analyze the state of any possible events such as emergency and/or hazardous motions by combining various signal processing techniques using for example, (i) Multiple Hypothesis tracking matched to various kinematics of the vehicles 100, and (ii) Imaging of the vehicles 100 from satellite radar by using options such as (a) Inverse Synthetic Aperture Radar (ISAR) imaging based on the angular and linear motions of the vehicles 100; (b) SAR imaging of the sea and land surfaces for suspicious disappearances such as a crash or an immediate floating debris; and (c) Combination of both SAR and ISAR techniques.

GICS Method Steps

In various exemplary embodiments, the GICS 10 may include a series of steps to provide surveillance, tracking and positioning of vehicles (including suspicious vehicles) travelling on commercial air, sea and land routes. The series of steps may be broken into 3 main steps namely:

STEP 1: Checking positioning data utilizing cooperative or semi-cooperative techniques;
STEP 2: Cueing of Primary Radars utilizing Non-Cooperative techniques; and
STEP 3: Positioning refinement utilizing non-cooperative techniques.

This series of steps utilizing a combination of cooperative, semi-cooperative and non-cooperative techniques are now explained in detail in the following paragraphs.

To track fast and slow vehicles 100 globally using the minimum number of satellite constellation, the STEPs are executed with sequencing of RADAR 1, RADAR 2 and RADAR 3 modes within each satellite where:

(i) The sequencing of the three radar modes is to trigger the wide FoV of RADAR 1 mode to map the coarse locations of the N distressed vehicles 100 (airspace, sea and land) with the information on anomaly, after which RADAR 3 mode will sequentially perform high resolution measurement/imaging of these N number of possible distressed vehicles 100 for accurate analysis of the vehicles behavior. The sequencing of RADAR 1 and RADAR 3 modes is repeated as the satellites 50 moves at very high speed. To support the modes sequencing, the main characteristics of RADAR 1 and RADAR 3 modes include:
  a. RADAR 1 and RADAR 3 modes utilize mechanically steerable modes (electronic beam scanning may also be possible); the steered direction of Radar 3 mode is provided by the estimated direction of the vehicle 100 measured by Radar 1 mode; the steered direction of Radar 1 mode is provided by the estimated direction of the vehicle 100 by the semi-cooperative procedure provided by an initial STEP 1 to be described hereinafter;
  b. RADAR 1 mode uses a mono-pulse technique to perform the positioning estimation of the vehicles 100;
  c. The different ground coverage areas at STEPs 1, 2, and 3 represent a dimension (order of magnitude of the diameter of the circumscribed circle) i.e.
    STEP 1 (positioning based on semi-cooperative mode): 2000 to 3000 km
    STEP 2 (radar 1, non-cooperative mode): 1100 to 1600 km
    STEP 3 (radar 3, non-cooperative mode): up to 700 km
(ii) Where a sparsely distributed satellite constellation is selected, the semi-cooperative and Passive Bistatic Coherent Radar techniques technique under RADAR 2 mode will act as the gap filler modes to track distressed vehicles 100 outside RADAR 1 mode active coverage area, and to cue RADAR 3 mode; and
(iii) If hazardous or emergency behavior of a particular distress vehicle is imaged and observed from the RADAR 3 mode, an emergency sequencing (search & rescue procedure) will be activated. The GICS 10 will halt the regular sequencing modes and "continuously tracked" the distress vehicle with RADAR 3 only.

Surveillance, Detection and Positioning Utilizing Cooperative Techniques

Under normal operating situations, the GICS 10 will check the positioning of all vehicles 100 within the global coverage of the satellite constellation by reading the cooperative transponder signals 80 from the aircraft ADS-B, ship AIS, or land vehicle transponders. As will be readily understood by one skilled in the art, the ADS-B or AIS signals are for illustration only and can be replaced by any other signal emitted by the transponders and suitable for positioning estimation using semi-cooperative techniques.

STEP 1: Check Positioning Data Utilizing Cooperative or Semi-Cooperative Techniques As shown in FIGS. 1A and 12, STEP 1 allows for detecting the anomalies of transponder signals 80 and to register the true positioning of normal transponders by conventional decoding means. One skilled in the art will also understand that the real positioning of faked vehicle transponders can be continuously and independently estimated from each satellite 50 or a spatially distributed set of satellites, by passively measuring the direction of any available signal emissions originating from that vehicle.

Anomaly Detection

The following sub-steps are next performed to check for an anomaly.

Step 1.1: Decoding the Transponder Signals on Each Satellite

Each satellite 50 performs the decoding in a conventional manner. For ADS-B and AIS, the coding schemes are well understood by one skilled in the relevant art and will not be described in this disclosure. For instance, ADS-B uses PPM modulation with a sequence of 120 μs with a repetition period of 1 second in absence of radar coverage (open sea) while AIS uses a GMSK modulation scheme.

Given the huge distance of 700-1,000 km between the satellites 50 and the high velocity of the satellites of approximately 7,000 m/s, it will be necessary to consider (i) a partial or coarse compensation of the Doppler shift for each sector of interest as Doppler is angle dependent, and/or (ii) the ICAO identification information of aircraft in association with the flight plan which is known in the sector of interest.

Figure 3:
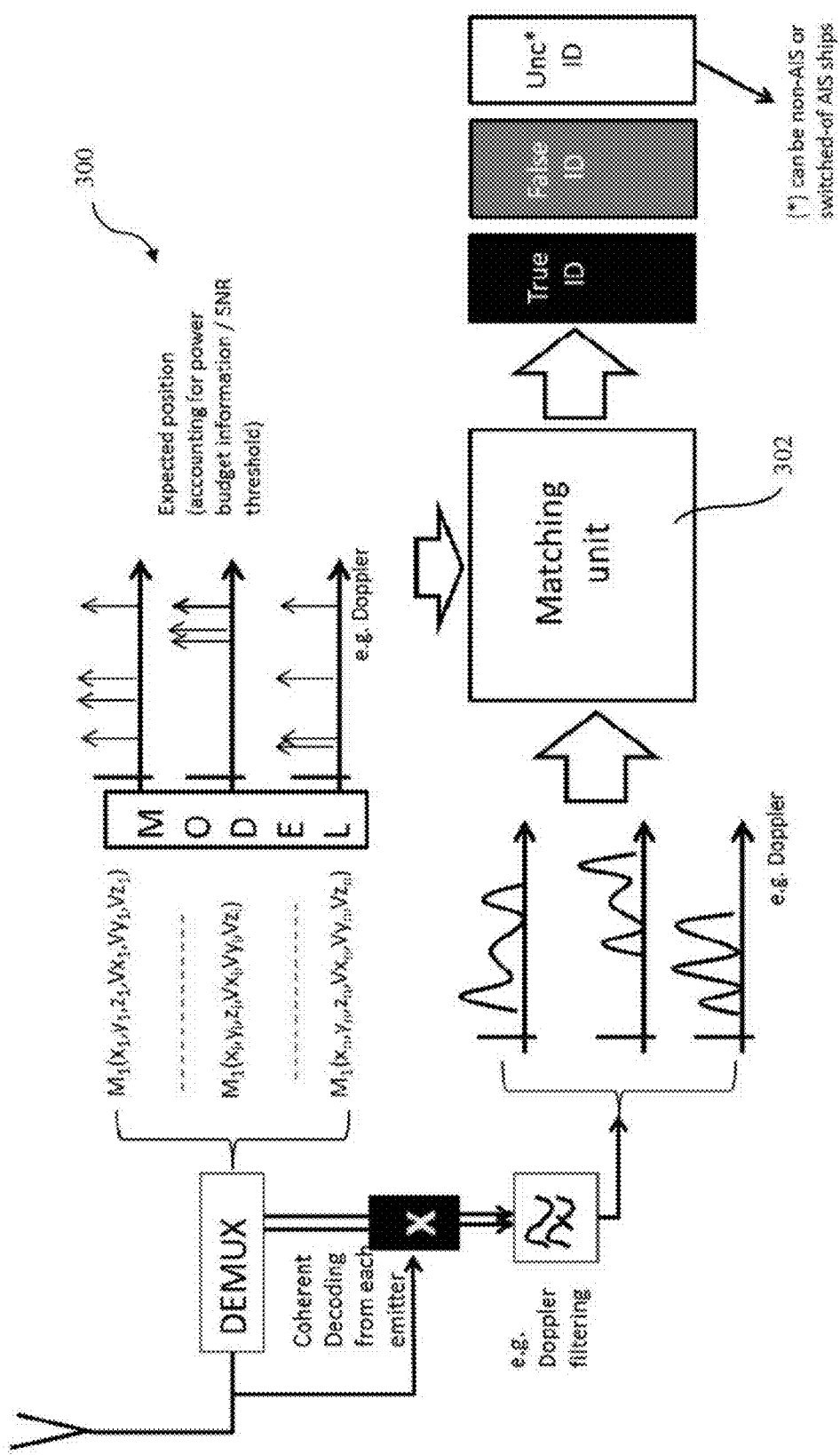
FIG. 3 shows the decoding of the transponder signals on each satellite and the mechanism of detecting the anomaly in accordance with an exemplary embodiment of the present invention.

This information allows for decoding the data received from the transponder in a reliable way. Once the decoding is performed, the coordinates and velocity as declared by the vehicle transponder can be obtained, i.e. either true or false. FIG. 3 illustrates the decoding of the transponder signals 80 on each satellite 50.

Step 1.2: Checking the Integrity of the Transponder Signals on Each Satellite

The integrity of the transponder positioning and navigation information is checked through the analysis of any available intercepted electromagnetic (EM) signals originating from the vehicle 100 (semi-cooperative technique) collected either from one satellite and/or simultaneously by the three satellites (LEO orbit) organized into different aspect angles with respect to the sector of interest. These satellites' aspect angles diversity can be achieved by organizing them into three orbital planes and aspect angles.

As illustrated in FIG. 3, a multilateration technique 300 may be applied as follows:

(a) Implementing Frequency Difference Of Arrival (FDOA) or Time Difference Of Arrival (TDOA) from a set of at least 3 satellites and measure either differential Doppler frequencies and/or differential time of arrival of the transponder signals;

(b) Computing the differential Doppler frequencies and/or differential time of arrival from the positioning data provided by the cooperative positioning system (transponder under ADS-B or AIS protocol); and (c) Computing the difference between the measurements and the computed values to provide an integrity classification such as "True", "False", "Unclassified" category.

Figure 4:
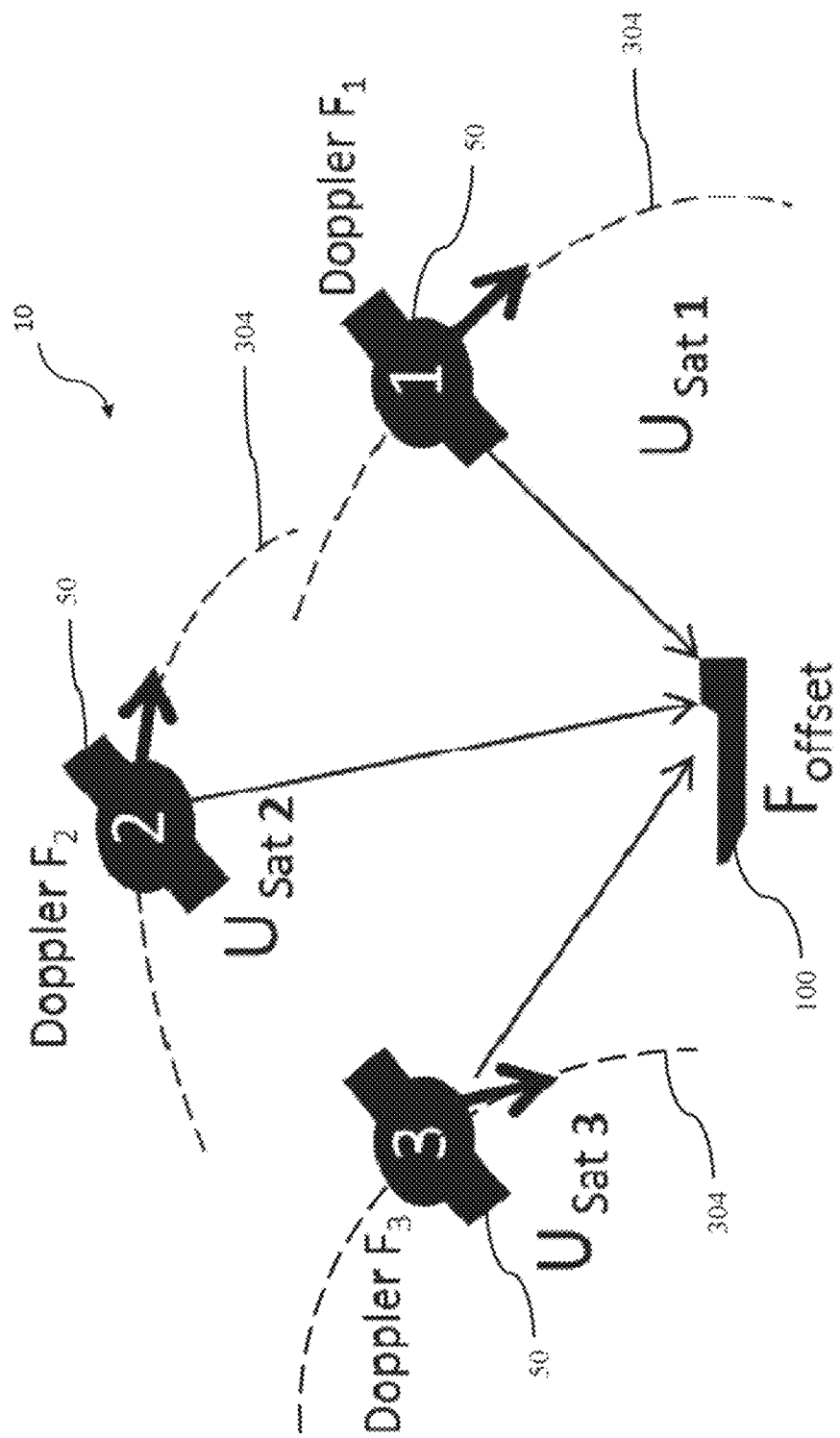
FIG. 4 shows a configuration of the small satellite constellation in a LEO 3-orbit plane.

FIG. 4 shows one configuration of satellites in a 3-orbiting plane. Since the coordinates x, y, z and speed $V_x$, $V_y$, $V_z$ of the vehicle 100 is known, the Doppler signature unique to the specific geometry of each moving satellite-vehicle pairs can be simulated on each satellite 50 because the coordinates and kinematics of the satellite 50 is also known. Since the three satellites are in different orbiting planes, there will be a different Doppler shift for each satellite-vehicle pair. Note that the Doppler shift is mainly due to the displacement of the satellites 50 and not due to the displacement of the vehicles 100. However, the unknown offset frequency of the vehicle transponders has to be compensated. The model of received frequency after decoding the transponder modulation code may be broadly expressed as follows:

$F1 = F_{offset} + F_{Doppler}$ Sat 1 (U Sat 1)
$F2 = F_{offset} + F_{Doppler}$ Sat 2 (U Sat 2)
$F3 = F_{offset} + F_{Doppler}$ Sat 3 (U Sat 3)

Where $F_{Doppler}$ Sat i (U Sat i) is a function of the positioning through the formulation of the unit direction vectors U Sat i.

As depicted by FIG. 3, the matching unit will be fed by the real Doppler values, extracted from the previous measurements and the modeled Doppler values based on the declared positions of the vehicles 100. The output of the matching unit is an error signal which, above a certain predetermined level, will indicate a false position of the vehicle 100.

One important metric of this integrity check procedure is the sensitivity, measured in positioning. If we denote this sensitivity by [$S_x$, $S_y$, $S_z$], with reference to the chosen system of coordinates, for example $S_x = 300$ m, $S_y = 300$ m, $S_z = 1000$ m, only deviation superior to 300 m in the x, y plane, or superior to 1000 m in altitude can be efficiently observed and detected.

The previous 3 equations may next be linked together and the integrity check may be based on a likelihood test on two equations after replacing the value of $F_{offset}$. Although this test is implemented with only two satellites, the sensitivity may be degraded in one plane. Having a $3^{rd}$ satellite in a $3^{rd}$ orbit plane orbital therefore provides a more homogeneous sensitivity of the test in x, y.

In the case of an aircraft, since the velocity and heading are part of the information carried by the ADS-B signal, it is possible to take into account the Doppler shift due to the aircraft in the expression of the composite Doppler frequency.

The outcome of the anomaly check as shown in the Matching Unit of FIG. 3 may be of three kinds: (i) 1: expected positioning matches with the measured positioning; (ii) 0: expected positioning does not match with the measured positioning (spoofed scenario); and (iii) ND (Unclassified): No Decision (this may happen if one of the Doppler spectrum is not measurable). The anomaly check from each satellite 50 is continuously and permanently applied to all vehicles 100 within the FoV area 52. This permanent anomaly check may be totally based on passive transponder signal decoding and passive semi-cooperative measurements.

However, an ND (Unclassified) situation can also occur in the following cases which will be further investigated: (i) Presence of too many closely located transponder signals which results in a non-perfect decoding (demodulation); (ii) Propagation losses affecting the reception of signals on satellites; and (iii) Limited angles (non-favorable geometry of the 3 or N-orbit configuration).

Any anomaly such as a No transponder signal or a spoofed signal will trigger and cue the non-cooperative techniques in STEP 2. In rare situations where the vehicles 100 are not carrying any cooperative transponder systems such as in countries where aviation/maritime safety standards may not be stringent, while the GICS 10 cannot check for any vehicle anomaly symptom, the primary radars in STEP 2 can still provide an independent detection and positioning estimate of such vehicles 100 but at reduced update rates.

STEP 2: Cueing of Primary Radars Utilizing Non-Cooperative Techniques

FIGS. 1A and 12 illustrates three different radar modes, namely RADAR 1 mode, Gap Filler 1 and Gap Filler 2 modes (Gap Filler 1 and Gap Filler 2 being known as RADAR 2 modes) labelled collectively as STEP 2.

Case 1—Vehicle Anomaly within the Coverage of Radar 1 Mode

Any vehicle anomaly such as a missing or Spoofed transponder signal for example, discovered in STEP 1 will trigger and cue the Non-Cooperative system that selects a set of different radar modes depending on whether the suspicious/distressed vehicle 100 is within or outside the coverage area 52 of RADAR 1 mode.

Figure 5:
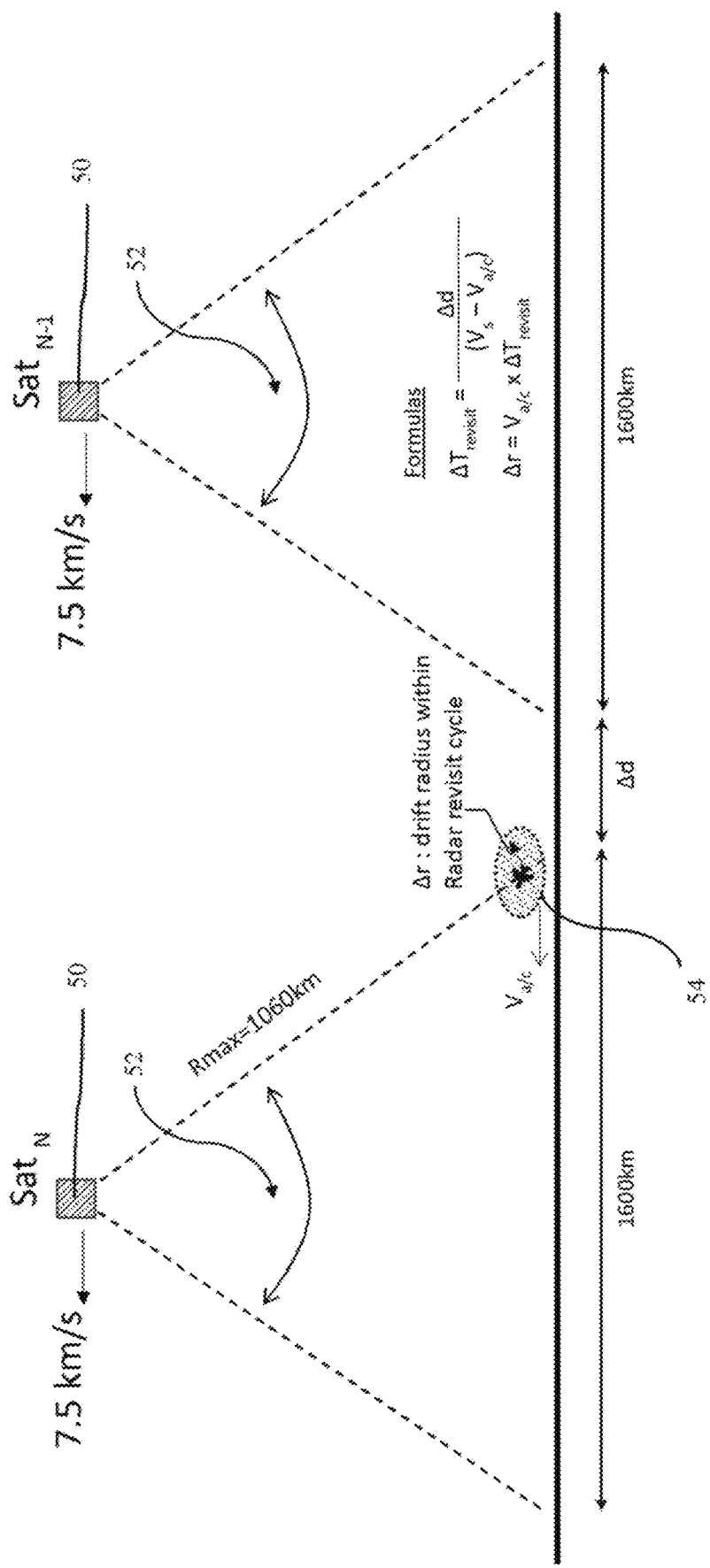
FIG. 5 shows the characteristics of RADAR 1 mode configuration and footprint to illustrate the design considerations for the minimal number of satellites in the constellation.

RADAR 1 mode is a non-cooperative fast vehicle detection mode which calls for a large ground coverage cone 53, due to the huge difference in the relative speeds between the satellites 50 and the typically high speed of the vehicles 100 (e.g. 250 m/s for airliners), it is intentionally configured to deploy the satellites 50 apart such that the detection ground surveillance coverage gap between neighboring satellites 50 is separated by Δd as shown in FIG. 5. Such a configuration helps to significantly reduce the total number of satellites 50 in the constellation with a distress vehicle revisit time gap $\Delta T_{revisit}$ which is small enough such that the GICS 10 may track the distressed vehicle 100 with a sufficient update rate that is timely enough to capture any crash mishap (typically a dive and crash which can take place between 60-90 seconds).

Managing the crash mishap event is the factor limiting the upper limit of $\Delta T_{revisit}$ for the GICS methodology. A setting of $\Delta T_{revisit}$ to a maximum of 2 minutes is recommended, and this may also be the time limit when the GICS 10 is used for tracking both fast vehicles such as airliners and slow vehicles such as ships and land vehicles. Based on the formula:

$$\Delta T_{revisit} = \frac{\Delta d}{(V-V)_{s\ a/c}}$$

$$\Delta r = V_{a/c} \times \Delta T_{revisit}$$

Where Δr is the drift radius within the radar revisit cycle, the tradeoffs between minimizing the vehicle revisit time gap and the minimal number of satellites in the constellation is shown in Table 1 below.

TABLE 1

| $\Delta T_{revisit}$ | Δd | Δr | Minimum numbers of satellites |
|---|---|---|---|
| 1 min | 435 km | 15 km | 98 |
| 2 min | 870 km | 30 km | 49 |
| 3 min | 1305 km | 45 km | 33 |
| 5 min | 2175 km | 75 km | 20 |

RADAR 1 mode will therefore track all vehicles 100 whose transponders are switched OFF, and the last updated positions of these vehicles are still within the same satellite coverage of RADAR 1 mode. Even if the vehicles 100 moved out of the current satellite coverage of RADAR 1 mode, as long as the inter-satellite coverage cone separation distance Δd, such that the next satellite behind could have non-cooperative radar visibility of the distress vehicles 100 within the $\Delta T_{revisit}$, the continuity of the target track from one satellite to the next satellite can be assured.

Case 2—Vehicle Anomaly Outside the Coverage of Radar 1 Mode

RADAR 2 mode is used to provide the detection and positioning of the suspicious/distressed vehicles 100 that are outside the coverage of the active RADAR 1 mode. RADAR 2 mode utilizes a passive coherent radar mode that receive bi static signals 82 reflected off any vehicles 100 that are illuminated by opportunistic emitters available in that surveillance area.

Figure 6:
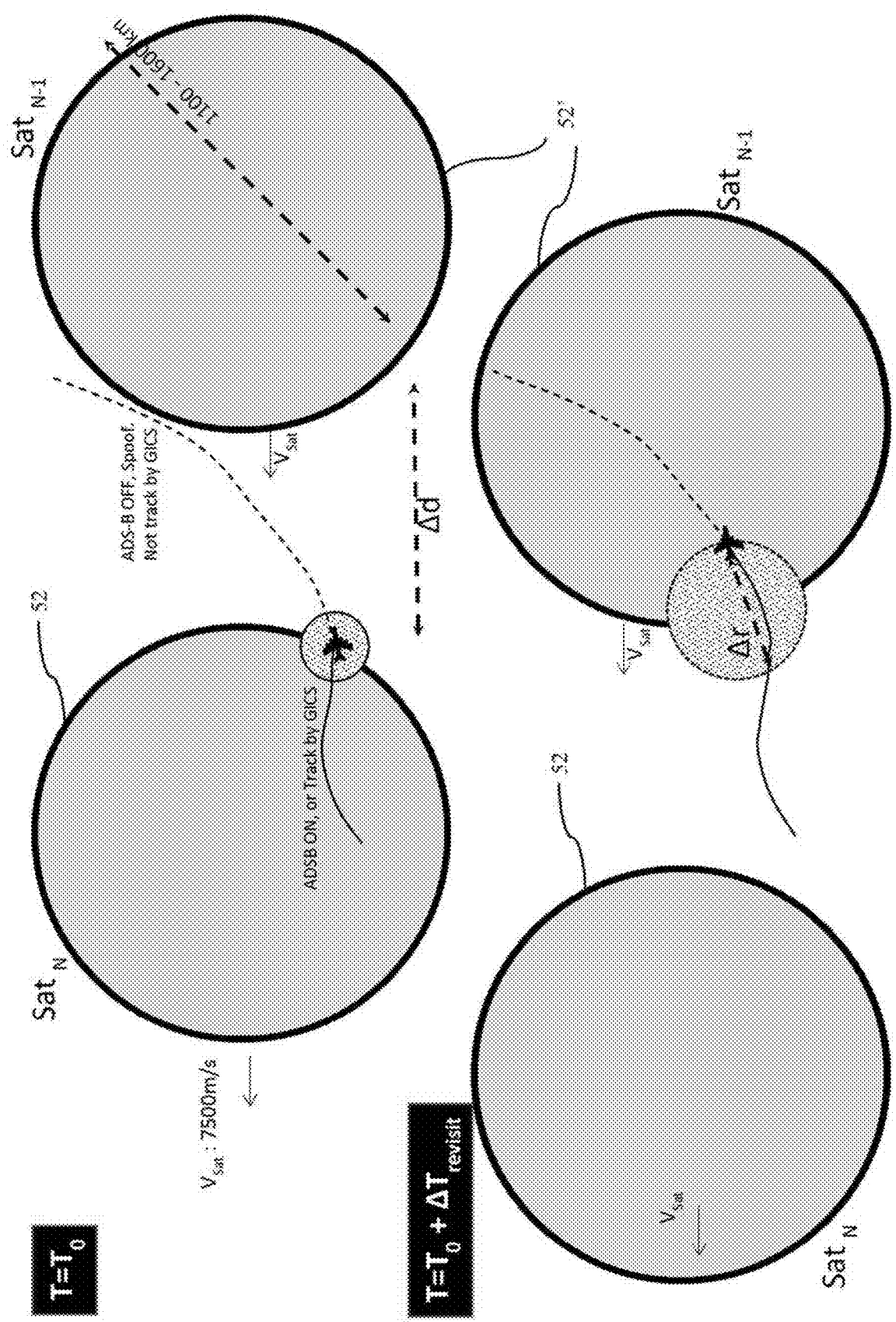
FIG. 6 shows the tracking of the vehicles outside of RADAR 1 mode FoV and footprint.

FIG. 6 shows the Tracking of the vehicles 100 outside the RADAR 1 mode footprint 54. To reduce the total number of satellites 50 in the constellation, the GICS configuration can increase $\Delta T_{revisit}$ (e.g. larger than 2 minutes), by supplementing two tracking methods (for the purpose of gap filler modes) that can track these vehicles 100 outside RADAR 1 mode active coverage. For example, assuming a 1,600 km baseline (FoV cone 53), for a circular orbit satellite constellation, a global permanent GICS surveillance coverage can be achieved with only 20 satellites using the following Gap Filler tracking methods and yet can potentially shorten the 5 minute $\Delta T_{revisit}$ to 2 minutes.

RADAR 2 mode works even if the vehicle transponders are switched off intentionally or as a consequence of a general/catastrophic failure. These emitters are signals of opportunity such as but not limited to other current and future emitters and may include the following:

(a) Universal transponder signals 80 from ADS-B (1090+/−3 MHz), AIS (161,975-162,025 MHz and its future variant such as VDES), IFF (whose integrity has been checked at STEP 1);

(b) Vehicle surveillance sensors like the aircraft nose weather radar, maritime navigation radar, ground and airborne radar transmitters, and (c) Globally available communication and navigation systems such as HFDL, ground based radio broadcast systems (e.g. HF and FM broadcasts) and others such as:

(i) High Frequency Data Link (HFDL is an ACARS communications media used to exchange data such as Aeronautical Operational Control (AOC) messages, Controller Pilot Data Link Communications (CPDLC) messages and Automatic Dependent Surveillance (ADS) messages between aircraft end-systems and corresponding ground-based HFDL Ground stations 200). Using the unique propagation characteristics of high-frequency radio waves, the Ground stations 200 provide data link communications to properly equipped aircraft operating anywhere in the world. In this way, pilots can communicate from any point in the global airspace (even at remote oceans) with someone on the ground;

(ii) FM Broadcast Emitters: This is a VHF broadcasting technology, usually from 87.5 to 108.0 MHz, and uses frequency modulation (FM) to provide high-fidelity sound over broadcast radio;

(iii) VOR/DME Emitters: These are combined radio navigation stations for aircraft, which consists of two radio beacons, placed together, a VHF omnidirectional range (VOR) and distance measuring equipment (DME) operating from 108 to 117.95 MHz. VOR produces an angle between the station and the receiver in the aircraft, while DME does the same for range; and (iv) Geostationary Satellite Emitters: These emitters are placed at an altitude of approximately 35,800 km directly over the equator and appear nearly stationary in the sky as seen by a ground-based observer. For example, BGAN—a new global mobile communications network is one such geostationary emitter.

Table 2 provides a comparison of the radar detection and performance potential when universal opportunistic emitter signals such as ADS-B and AIS are exploited in the bistatic (non-imaging) mode.

TABLE 2

| Opportunistic Emitters to perform Passive Radar mode | Detecting Anomaly Vehicle (Airliner) whose transponder is switched OFF/Spoofed | Detecting Anomaly Vehicle (Ship) whose transponder is switched OFF/Spoofed |
|---|---|---|
| AIS 162 MHz, Bandwidth of 9 kHz Frame duration: 30 ms Frame repetition: 2 to 10 s ERP: 2 to 10 W | Only if maritime route is under airline routes Detection distance: short due to lower emitter power and the smaller radar signature of commercial an airliner as compared to a large commercial ship signature | Only if ship close to emitter Detection distance typically less than a few km and applicable only for a fast moving ship target (exoclutter detection) Positioning through Doppler shift from satellite (synthetic antenna) Challenging to detect slow moving ship target due to sea clutter competing with the ship target signature |

TABLE 2-continued

| Opportunistic Emitters to perform Passive Radar mode | Detecting Anomaly Vehicle (Airliner) whose transponder is switched OFF/Spoofed | Detecting Anomaly Vehicle (Ship) whose transponder is switched OFF/Spoofed |
|---|---|---|
| ADS-B 1090 MHz Bandwidth ~1.2 MHz (0.8 μs) Frame repetition: 1 s or 6 s Frame duration 120 μs ERP: 50 to 100 W | Aircraft/intruder detection within the route corridor Detection distance: longer due to higher emitter power | For maritime ship detection |

Gap Filler Mode 1

If a cooperative, but spoofed transponder is transmitting signals outside the Radar 1 mode coverage, the vehicle 100 (e.g. an airliner) will still be detected as an anomaly because the positioning data (derived from the spoofed transponder) is not coherent with the positioning data derived from the semi-cooperative data. Therefore, the distressed vehicle 100 can still be tracked using the semi-cooperative technique.

Gap Filler Mode 2

Typically, passive bistatic radars based on conventional emitter characteristics as aforementioned have short detection ranges and coverage and the tracking accuracy/resolution is coarse. As such, the GICS 10 provides two passive bistatic radar techniques that can overcome such limitations i.e. (i) Passive MIMO SAR Imaging and (ii) Passive HF Skywave Radar (Spacebased Receiver).

Passive MIMO (Multiple-Input Multiple-Output) SAR Imaging

Figure 7:
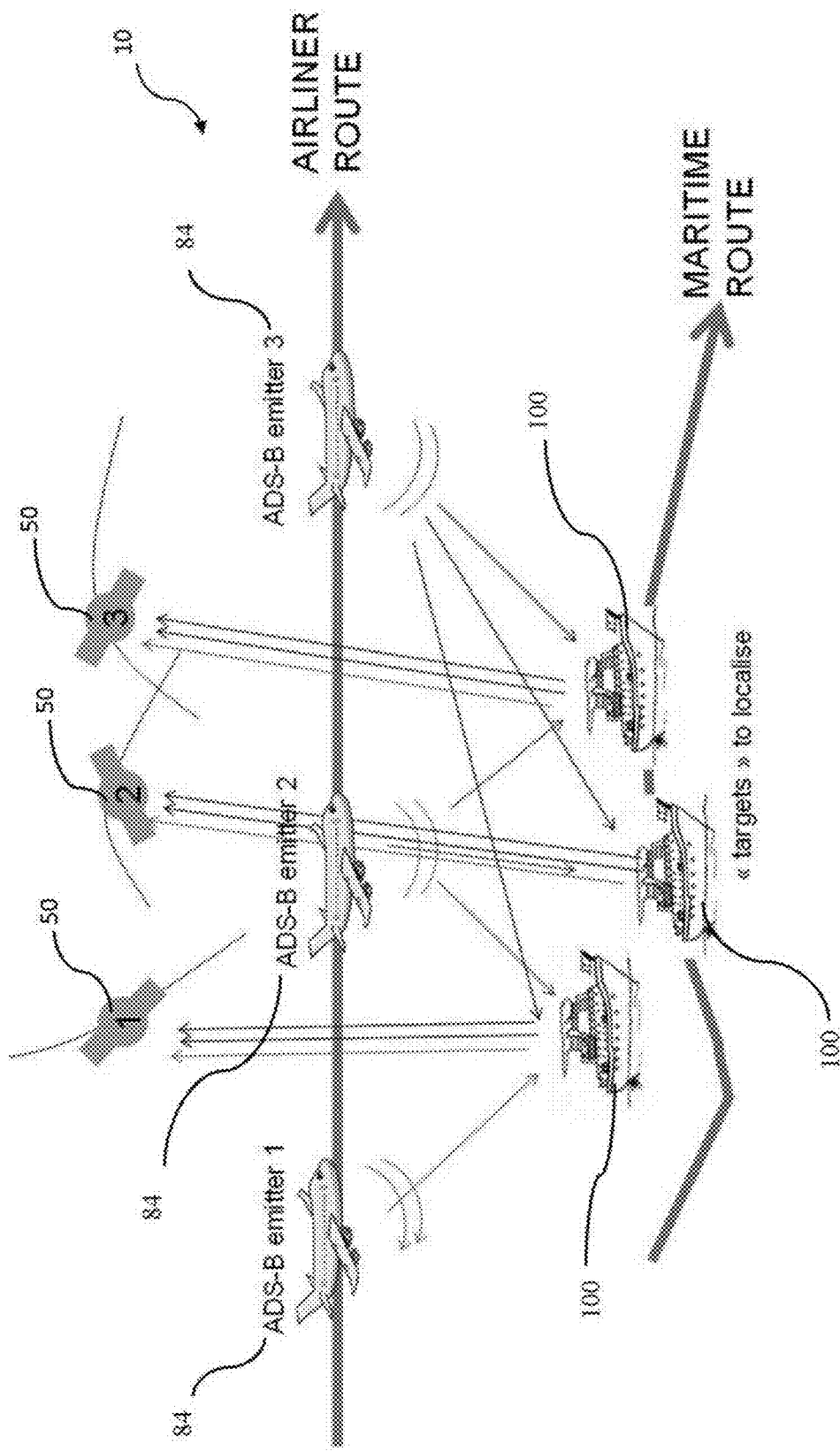
FIG. 7 shows the concept of a passive bistatic radar re-using ADS-B emissions to detect ships using a Multi-Input, Multi-Output (MIMO) processing technique for increasing the ship positioning accuracy.

FIG. 7 shows the concept of a passive radar re-using ADS-B emissions 84 to detect and locate ships in a MIMO (Multiple Input Multiple Output) configuration. MIMO is a configuration where the transmitting and receiving functions are split into separate units. This type of configuration can generate a diversity of information to improve the detection and the positioning accuracy. Passive MIMO-SAR based on aircraft ADS-B transponders is new and promising given the high probability of a large number of aircraft transponders present in the airspace and the GICS 10 integrity test which is precisely applied to the transponder signals 84.

Using the Passive MIMO-SAR when the aircraft is outside the coverage of any land based radar, at least two or more images (depending on the number of satellites present in the field of view) can be formed in different slant planes. Each of the images has a resolution of 40 m×100 m (100 m is due to the bandwidth of ADS-B and the 40 m is the equivalent of the previous 26 m but with a degradation due to the bistatic radar geometry). Note that for maritime surveillance, the concern on latency between satellites revisiting over the same area is less (unlike air traffic management) due to the slow motion of the ships.

Bistatic effect is a geometric effect which appears when the distance between the receiver and the transmitter are no longer negligible in comparison to their distance to the surface area to image. Due to the bistatic configuration, the nadir specular reflection (which is well known in conventional space-borne radar) is significantly reduced. While the use of a large wavelength at L-band (30 cm for ADS-B signals) may reduce the clutter return from capillary waves thereby reducing the clutter and improving the quality of the image, the use of a large wavelength (L-band) is also known to be favorable to the successful application of change detection techniques. As a simple illustration, change detection can rely on the difference between images collected at different times to detect moving or appearing vehicles and then improve the sensitivity and detection probability.

The viability of the Passive MIMO SAR imaging based on the transmission of aircraft ADS-B signals with illuminated echoes from ground vehicles 100 (ships) or fast airborne vehicles 100 (aircrafts) received by a LEO (low earth orbit) satellite, can be explained and compared with a space-borne bistatic SAR design published by Krieger & Moreira [*IGARSS*, 2010, *The future of space borne Synthetic Aperture Radar*, http://fr.slideshare.net/grssieee/we31103]. The Krieger & Moreira design is based on a 36,000 km Geostationary (GEO) X-band frequency transmitting satellite and a LEO satellite for receiving the ground echoes.

NESZ is a measurement of the quality of the radar image based on image contrast (or detectability) between the target of interest and the surrounding background clutter. Usually, a NESZ of −15 to −20 dB is considered as a necessary performance specification for a quality space-borne SAR image.

Table 3 below shows that with an average ADS-B transmitted power of 50 W (from aircraft transponder), the GICS configured MIMO-based SAR satellite can achieve an operationally useful distance of 40 km and similar good quality detection performance (NESZ performance metric) as the Krieger & Moreira GEO-LEO bistatic SAR design.

TABLE 3

| | GEO-LEO from Krieger & al. | GICS 10 concept Airliner + LEO ADS-B signals | Difference (dB) NESZ |
|---|---|---|---|
| Bandwidth (MHz) | 300 | <300 | |
| Tx antenna aperture (m$^2$) | 100 | 0.2 | −26,98970004 |
| Emitter to ground distance (km) | 36,000 | 40 | 59,08485019 |
| Rx antenna aperture (m$^2$) | 6 | 0.2 | −14,77121255 |
| Receiver to ground distance (km) | 400 | 700 | −4,860760974 |
| Resolution (min) | 3 | >3 | |
| Resolution (max) | 6 | 150 | |

TABLE 3-continued

| | GEO-LEO from Krieger & al. | GICS 10 concept Airliner + LEO ADS-B signals | Difference (dB) NESZ |
|---|---|---|---|
| Average transmitted power | 1,000 | 50 | −13,01029996 |
| | | Global impact on NESZ in dB | <−0,54 567123332 |

Note: a higher negative value is better as NESZ is a sensitivity value

Figure 8A:
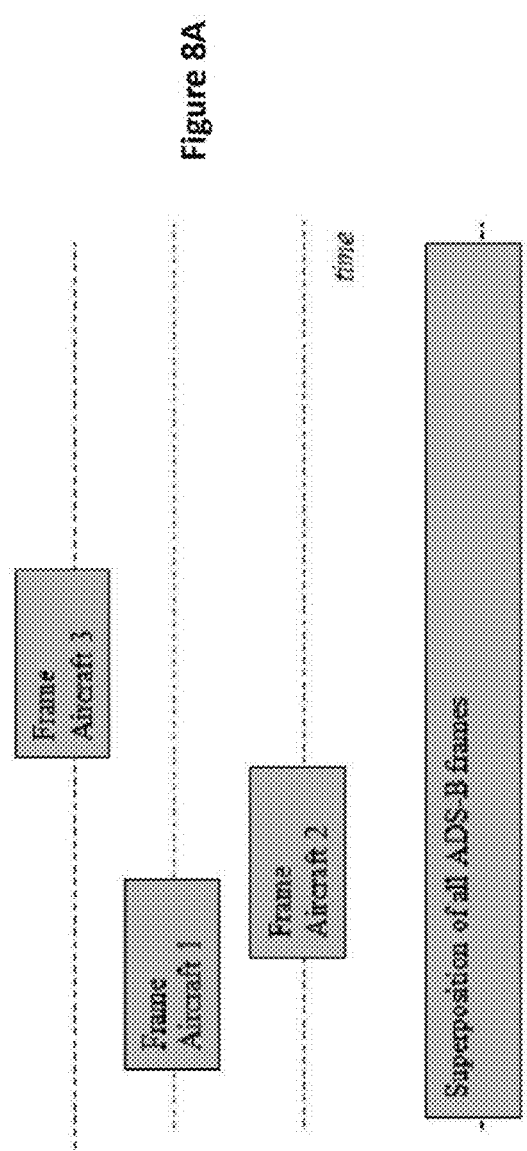
FIG. 8A shows a typical ADS-B signal frame.
Figure 8B:
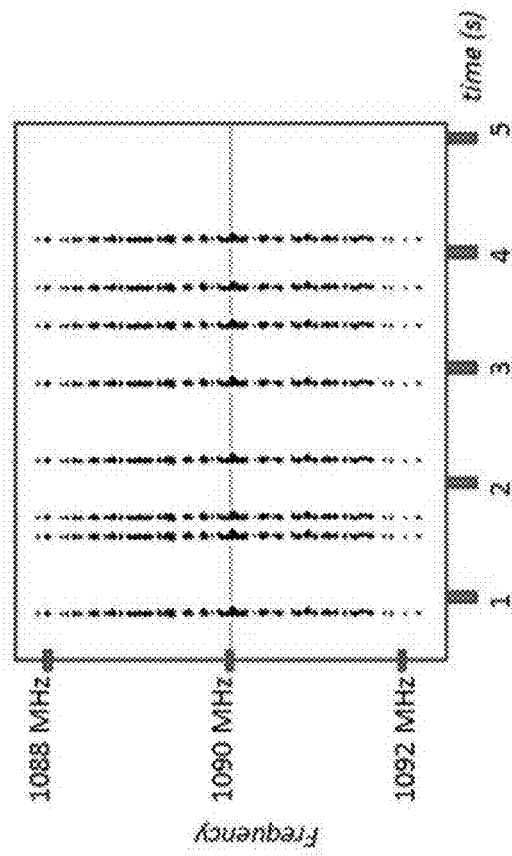
FIG. 8B shows a typical spectrum (time on X-axis, frequency on Y-axis) of the ADS-B signal.

The aircraft transponders considered here are fully registered, thanks to STEP 1. Moreover, the different transmissions are separable in time thanks to the frame decoding. They can also be used as emitters of a full MIMO radar operating in TDMA. FIG. 8A shows the expected superposition of the frames. An illustration of a real ADS-B spectrum showing the distribution in time of the ADS-B frames is also shown in FIG. 8B.

The ADS-B MIMO-SAR imaging technique re-using signals from multiple transmitting vicinity ADS-B fast vehicles (Transponders ON) to illuminate the vehicle 100 under tracking (Transponder OFF or Spoofed) is an important point to provide the surveillance gap filler when the distressed vehicle 100 is outside the active radar coverage due for example to a sparse constellation.

While the passive MIMO SAR imaging method is illustrated here using the ADS-B emission as the signal of opportunity, it should be obvious to those skilled in the art that this same method may also be applied to other suitable signals of opportunity as aforementioned that may achieve even longer imaging distances than the 40 km example with ADS-B emitter to detect and locate ships and/or aircrafts.

Passive HF Skywave Radar

Figure 9A:
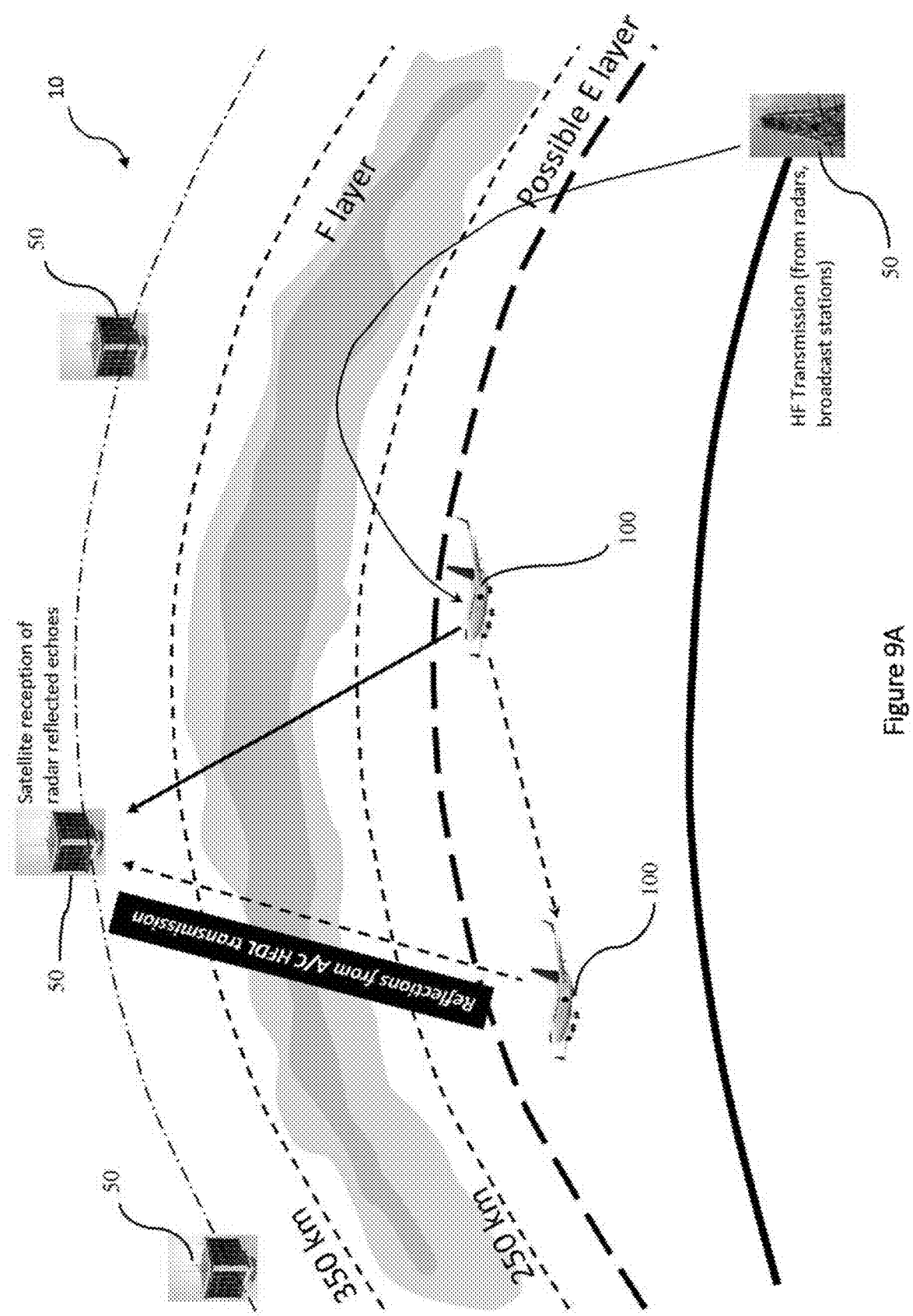
FIG. 9A shows a Bistatic Surface transmitting/space receiving HF Skywave configuration and an Airborne transmitting/space receiving HF concept for utilization as a gap filler detection option under the RADAR 2 mode.

Traditionally, ground based (monostatic) active HF Skywave Radars such as the JINDALEE system in Australia have been used for aircraft (and possibly ship) detections at very long distances. Under certain conditions (for example ionization by solar radiation) in the atmosphere, HF radio signals transmitted at an angle into the sky will be reflected back towards the ground by the ionosphere (effective in a region of Earth's upper atmosphere from about 250 km to 350 km as shown in FIG. 9A), thus allowing them to return to earth beyond the horizon. Signals will be scattered off desired targets (vehicles 100) back towards the sky, reflect off the ionosphere again, and return to the receiving radar antenna by the same path. F2 and E layers in FIG. 9A are two ionospheric layers where the conditions are conducive for HF Skywave Radar detection.

A typical monostatic HF Skywave Radar has the following detection characteristics: Airliner targets detection at 2,000 km-3,000 km (or further); applicable only in the presence of ionospheric F2 layer, which is the usual case, except in the presence of the E layer, where detection ranges can be longer. However, the E layer does not appear everywhere such as in the equatorial region where the E layer does not appear at all.

For global coverage, the obvious way is to deploy a uniformly located network of such active Skywave Radars over the Earth (land and sea) surfaces. This is highly challenging to deploy because of (i) a need for cross-boundary national sovereign permission which is political; and (ii) due to the low frequency of the HF radar band, the received antenna array size required will be very large (about 1 to 2 km$^2$), and thus is difficult and expensive to secure large pieces of land for the deployment of such a HF Skywave Radar.

Figure 9B:
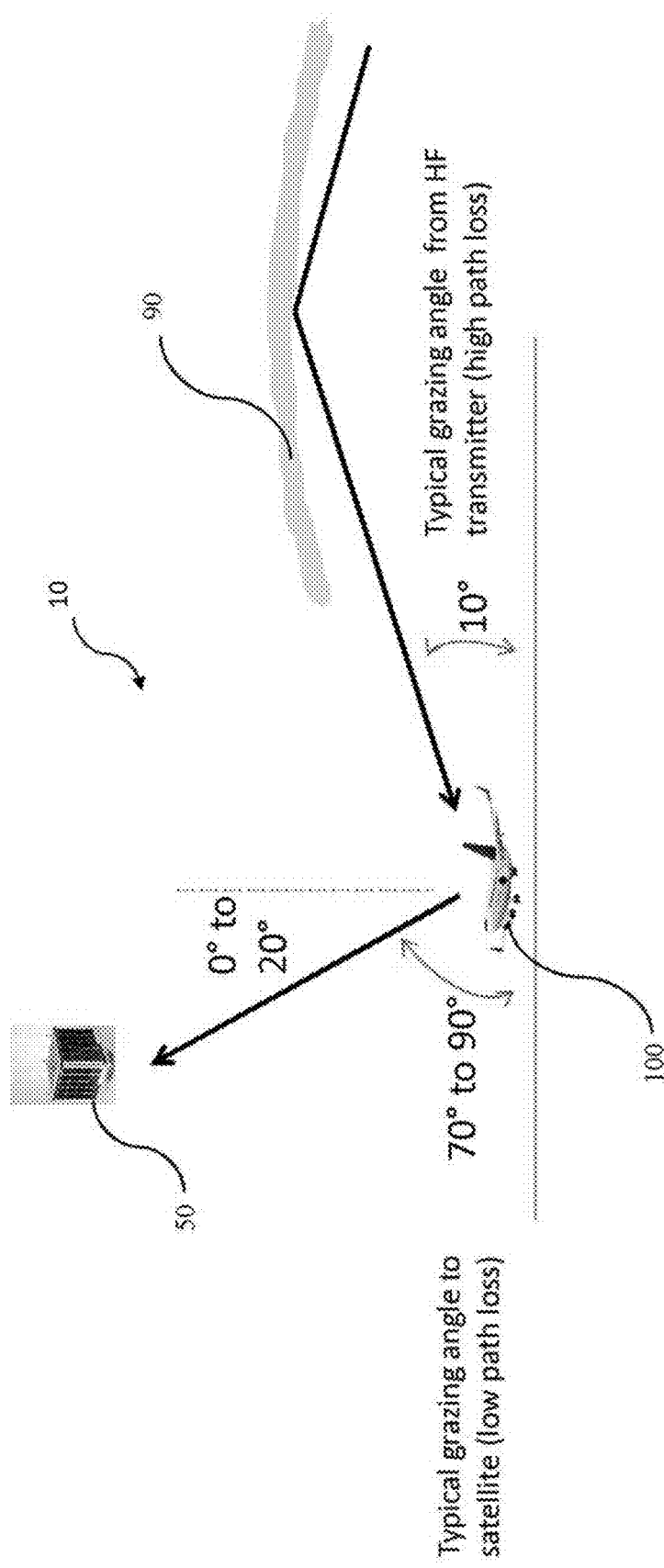
FIG. 9B shows the geometrical definitions for the HF propagating radar signals under the RADAR 2 mode.

The key design considerations to realize for the GICS include:

(i) Employing the correct radar transmitting frequency values where signals will most efficiently bounce off the ionosphere on a $1^{st}$ path and penetrate the ionosphere on a $2^{nd}$ signal path (the signal propagating path between the target and the receiving satellite) to be further intercepted by the satellite receiver as shown in FIG. 9A. The optimal transmitted frequency will depend on the radar signal incidence or grazing angle (Note that the incidence angle is defined with reference to the local vertical axis, grazing angle is defined with reference to a local horizontal line). Therefore, a potential working point can be reached when the transmitted beam is operating at 18 MHz (or below) is striking the ionosphere at the F2 layer at a grazing angle of 10° and a satellite picking up the vehicle 100 (target) reflected echoes at a 20° (or less) incidence angle as shown in FIG. 9B; and (ii) At small reflected angles on the $2^{nd}$ path, the propagation loss is much smaller because of a much lower attenuation through the ionosphere due to high incidence and the shorter distance of the Target-satellite Receiver. This is remarkable in comparison to a standard monostatic HF radar which suffers from severe attenuation (low grazing angle) in a similar way.

The transmitting sites may be provided from a combination of dedicated or fixed transmitting sites and/or existing globally located HF broadcast sites such as:

(i) HF (fixed) Broadcasting Sites having a typical transmitting power of 500 KW with a transmitting gain of 20 dB, a beamwidth of 20° and a transmitter efficiency of 70%;

(ii) Relocatable Transmitting Sites over remote ocean areas such that 500 KW Broadcast HF transmitting systems can be deployed on ships or offshore oil/gas platforms; and (iii) Mobile transmission based on HFDL signals transmitted by aircrafts. HFDL (High Frequency Data Link) is a communications system used to exchange data or messages between aircraft and corresponding ground-based HFDL Ground stations, when the aircrafts are within the coverage of these HFDL Ground stations.

The main detection challenge with regards to the positioning of the vehicles 100 is the impact of the clutter Doppler spread due to the fast motion of the satellites 50. Thus, the GICS 10 is configured to provide strong clutter suppression solutions including:

(i) Employing an Along-Track Interferometry scheme via an array of at least three satellites orbiting in a non-periodic spacing to effectuate an MTI clutter cancellation whereby:

(a) With regards to the MTI clutter, the along-track interferometry baseline distance will be a compromise between the limit imposed by the coherency of the MTI clutter and the need for a sharp notch in the velocity domain. To remove the periodicity of the notches, frequency diversity can be utilized; and (b) With regards to the Skywave clutter resulting in additional spread due to instability of the ionospheric layers. If the spread is 2 Hz, the GICS 10 cannot take two images of the vehicle 100 at times separated by more than 500 ms assuming that 200 ms is the limit. In this case the two receiving along track interferometric satellites 50 must be separated by not more than 0.2×7000 or 1400 m at the maximum.

(ii) High (range and Doppler shift) resolutions for reducing clutter cell radar cross section (RCS) by increasing coherent integration time. The GICS 10 can coherently integrate the returned echo signals reflected off the vehicle 100 for a long duration because the geometry of the target motion can be predicted to follow an a-priori straight flight route. This method will improve the radar Doppler resolution, which in turn helps to suppress the clutter energy that is competing with the target echo energy and make target detection easier.

STEP 3: Positioning Refinement Utilizing Non-Cooperative Techniques

Figure 10:
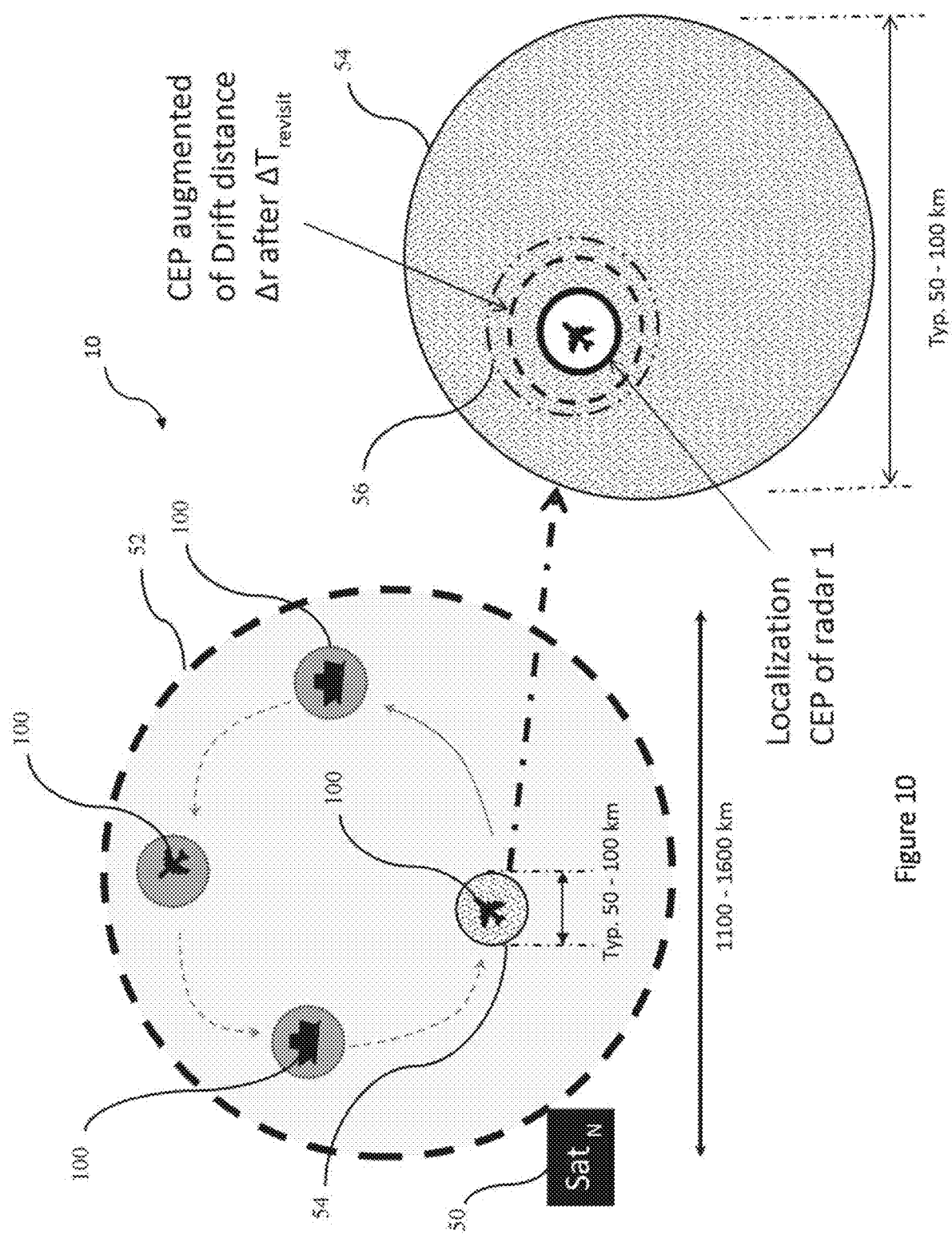
FIG. 10 shows the coverage of the Wide Swath Low Frequency Radar (WSLFR)/High Resolution Microwave Radar (HRMWR)

In this step, a high-resolution Microwave Radar is utilized, cued either by the RADAR 1 or RADAR 2 modes. RADAR 3 mode utilizes an active high resolution Microwave Imaging Radar 18 which further utilizes synthetic aperture techniques to perform the imaging and operates in the C, X, Ku or Ka frequency spectrum to provide the high-resolution imaging and tracking. The high-resolution imaging radar method is all weather, day and night operational. RADAR 3 mode can be used for both slow and high speed vehicles 100 moving in airspace, sea and land respectively. The smaller instantaneous beam Footprint 56 can either be mechanically or electronically steered within the surveillance ground coverage cone of RADAR 1 mode as illustrated in FIG. 10. The deployment of RADAR 3 mode architecture to simultaneously detect and provide positioning of both slow and high speed vehicles 100 may further support an integrated Air and Maritime traffic management and surveillance.

For example, if X-band frequency is chosen for RADAR 3 mode, the instantaneous radar beam Footprint 56 is about 20-30 km; this instantaneous beam can be mechanically or electronically steered within a cone of ground coverage corresponding to the area cued by Radar1 mode to track and/or image multiple distressed vehicles 100 if they happen to occur in the cone 52. However, it takes too long for the RADAR 3 mode beam to steer from one distress point to the next distress point and back & forth as it can take more than 1 minute depending on the agility of the satellite to revisit each distress target at a $\Delta T_{revisit}$ without losing the new position of the non-cooperative vehicle. Thus RADAR 1 mode as shown in FIG. 10 will provide the instantaneously huge illuminated footprint 54 to help re-indicate non-cooperatively the coarse location of the distress vehicles 100. In this case, $\Delta T_{revisit}$ should not be more than 2 minutes for high speed vehicles 100. Note that in the actual radar imaging mode, the imaging spot/swath could be reduced to just 3 km×3 km or 10 km×10 km.

Figure 11:
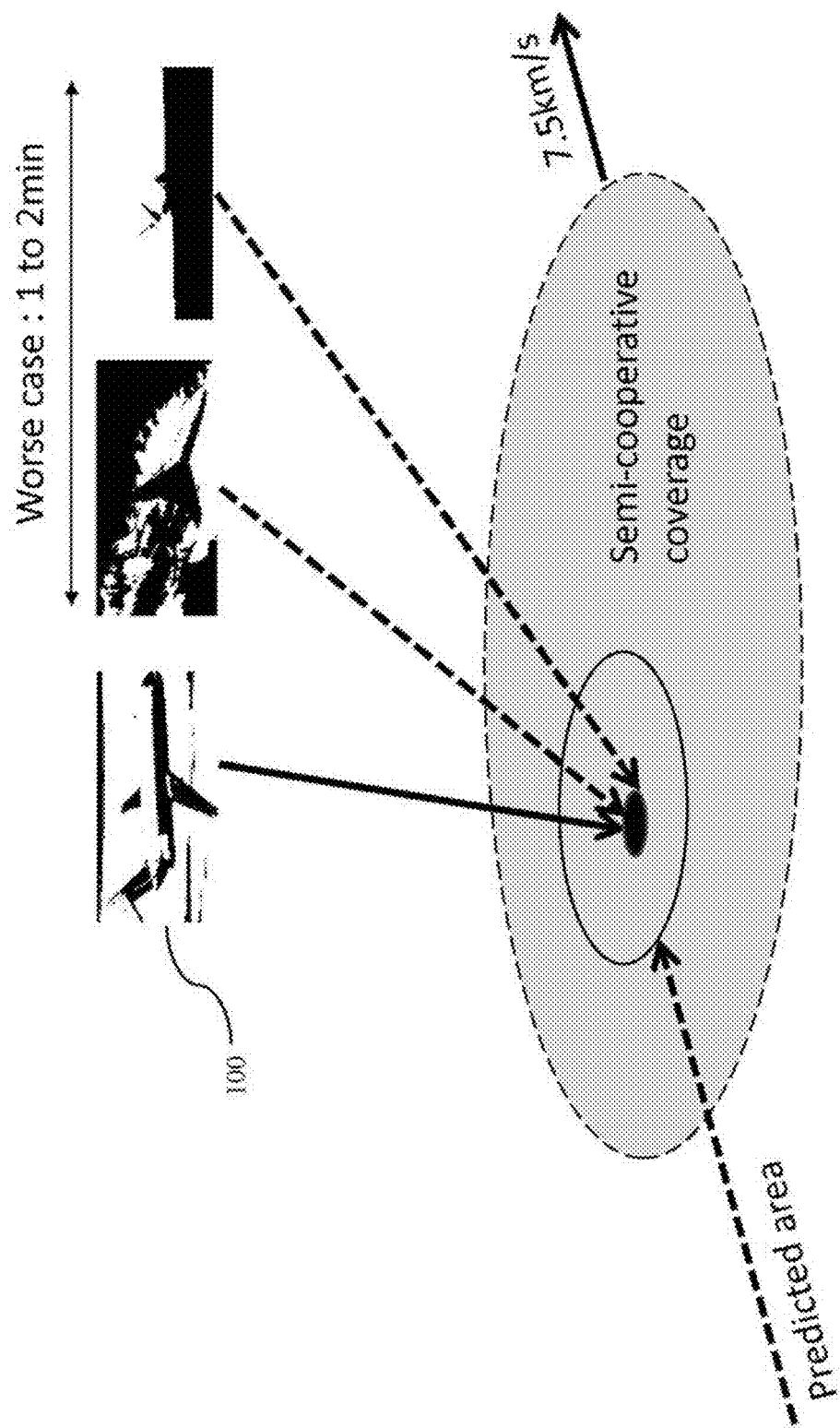
FIG. 11 shows the active RADAR 3 mode coverage of the predicted area that can be utilized for attending to different hazardous situations.

RADAR 3 mode resolution may include a high resolution of below 10 m (with signal spectral bandwidth of at least 35 MHz). For fast vehicles, such as airliners, the high tracking resolution and accuracy of RADAR 3 mode, can in real-time also help to pack airborne airliners closer especially for landing. This is because very congested air traffic network burns unnecessary fuel, resulting in schedule delays and environmental pollution. There is therefore pressure to increase the air traffic handling capacity such as reducing minimum inflight aircraft to aircraft separation distances with better aircraft tracking solutions.

Where RADAR 3 mode proceeds with the analysis of the multiple scenarios on the trajectory kinematics behavior of the distress vehicles 100, the processing steps may be able to compensate the radar echoes signal structures due to the non-linear kinematics (e.g. a dive) so as to improve the positioning accuracy estimation and to sharpen the image. Examples of the hypothesis and classification of the hazardous situations of the fast vehicles 100 is shown in FIG. 11 and includes:

(i) Dive trajectory—Using appropriate aircraft (vehicle) dive kinematics models as well as the prediction of vehicles trajectory motion, the GICS 10 can compensate the Doppler of the vehicle's motion to get a sharp focused ISAR image of the dived vehicle 100. This trajectory motion prediction is based on the last known location position of the vehicle and the track estimation using the MHT (Multiple Hypothesis tracking) which is a technique that uses a set of track hypotheses that are not in conflict (i.e. that do not share any measurements at any time);

(ii) Mid-course explosion—Exploded disintegrated parts of the vehicle can be captured by the Inverse SAR imaging technique. This technique provides forensics on the likely origination of the explosion of the vehicle;

(iii) Crash zone prediction—From the detected and measured dive kinematics, Radar 3 mode can predict accurately the crash point; and (iv) Debris Spread Forensic—Very short imaging revisits of the predicted crash zone, made possible by the constellation of RADAR 3 mode, provides an estimation of the crash scenarios such as:
  (a) Debris spread (potential indication on the degree of mid-coarse explosion before the debris sunk and deprive of any forensic opportunity); and
  (b) Evidence of sinking vehicle.

Once the RADAR 1 mode (wide swath) and RADAR 3 mode (fine) beams have moved out of the distress vehicle locations, the active radars are turned OFF, substituted by the next satellites 50 available in the vicinity. In this way, radar power demand is manageable for a satellite without the need to be continuously switched ON.

Under RADAR 3 mode for tracking maritime or slow land vehicles, as the vehicle speed is typically slow, a useful revisit time gap for each distress ship can be extended up to 10 minutes (for ship traveling up to 30 knots). This means that the sparse density of the satellite constellation constructed for fast vehicles will have very good tracking quality for the slow vehicles. As RADAR 3 mode, which is an imaging mode, both the slant range and cross range resolutions (for a 2-dimensional image) can be 7 m to 10 m for the detection of big and medium commercial ships. However, we need good resolution of at least 3 m to classify the smaller distressed tracked ships. The cross-range resolution can be kept to 3 m as well.

The GICS 10 is also capable of simultaneously detecting the positioning of distressed/suspicious vehicles 100 in the air, sea and land routes. Operating with primary radar detection units, the GICS 10 may first provide detection and location of vehicles 100, independent of whether the transponder signals 80 are ON or spoofed. This system and method of detection and locating positioning of vehicles is further fully non-cooperative.

Due to the exponential increase in air transportation demand, highly congested air traffic network burns unnecessary fuel causing unnecessary fuel over-usage thus impacting air travel costs, schedule delays and environmental pollution. There is pressure to increase the air traffic handling capacity (e.g. reducing the minimum in flight aircraft to aircraft separation distance) with cost-effective, more accurate aircraft tracking solutions. This can lead to more profit generation for Air Navigation Service Providers (ANSP) as the GICS 10 can reduce the incoming flight aircraft to aircraft separation distances by:

(i) exploiting the high resolution (better than 10 m) imaging mode at a high update rate (for example 2 minutes) of RADAR 3 mode to allow air traffic controllers to manage more confidently the packing of incoming flight aircrafts closer;

(ii) By fusing the output data from both RADAR 3 mode and RADAR 2 mode (using passive radar technique in STEP 2 to exploit simultaneously multiple signals of opportunity like the ADS-B, FM Broadcast, GEO satellite emitter) with existing cooperative air traffic control data, the GICS 10 can significantly enhance the overall positioning accuracy of the tracked mobiles over the airport air space to facilitate the reduction in the separation distance between aircrafts limited only by vortex wakes when two aircrafts get too close to each other.

In various exemplary embodiments of the present invention, FIG. 12 illustrates the process of surveillance, integrity check and tracking of vehicles 100 travelling in an airspace, sea and land route. The process 500 begins with: initial STEP 1 for checking the integrity of the transponder signals 80 for anomalies to define a distressed vehicle 100; intermediate STEP 2 for detecting a coarse positioning of the distressed vehicle 100; and lastly STEP 3 for refining the coarse positioning of the distressed vehicle 100, wherein the distressed vehicle 100 is further tracked for search and rescue operations.

STEP 1 may further include: Step 502 for detecting and decoding transponder signals 80 from a plurality of vehicles 100 using cooperative techniques; Step 504 to locate all vehicle signal emission sources utilizing a semi-cooperative technique; Step 506 for checking the integrity of the transponder signals; and Step 508 for detecting and locating an anomaly from the transponder signals 80, wherein a vehicle with an anomaly is a vehicle in distress. Steps 502 to 508 are repeated sequentially to provide a continuous integrity check on all vehicles 100 in the FoV 52 of the main beam of the WSLFR as represented by return loop 510.

STEP 2 may further include: Step 512 for detecting the coarse positioning of a distressed vehicle 100 using a Wide Swath Radar if the distressed vehicle 100 is within the Wide Swath Radar coverage; Step 514 for detecting a distressed vehicle 100 using a Passive Coherent Radar if the distressed vehicle 100 is outside the Wide Swath Radar coverage; Step 516 under a first Gap Filler mode for detecting a distressed vehicle 100 with spoofed transponder utilizing a semi-cooperative technique; and Step 518 under a second Gap Filler mode for detecting a distressed vehicle 100 using (i) MIMO SAR Imaging Radar 520 or (ii) Passive HF Skywave Radar 522 for detecting bistatic signals if the transponder signals 80 is not detectable. Steps 512, 516, 520 and 522 may further cue a Microwave Radar in step 524.

STEP 3 may further include: Step 526 for refining the coarse positioning of the distressed vehicle 100 comprises using a Microwave Radar and Step 528 for further accurately tracking the distressed vehicle 100.

STEPs 1, 2 and 3 are repeated sequentially to provide a continuous surveillance, detection and tracking sequence as represented by return loop 530. Finally, Step 532 is activated under an emergency mode for search and rescue operations.

However, it is possible that a basic simpler process of continuous surveillance, integrity check and tracking of vehicles 100 in GICS can adopt a repeated sequence of STEP 1, Step 512 of STEP 2 (RADAR 1) and Step 528; if a larger $\Delta T_{revisit}$ (e.g. 5 minutes) for the same minimal number of satellites in the constellation and waiver of forensic function (and more accurate tracking) are operationally useful.

While the invention has been described with respect to certain specific embodiment(s), it will be appreciated that many modifications and changes can be made by those skilled in the art without departing from the spirit of the invention. It is intended, therefore, by the description hereinabove to cover all such modifications and changes as fall within the true spirit and scope of the invention.

The invention claimed is:

1. A method of acquiring, positioning and tracking of vehicles travelling in airspace, sea and land travel routes via a constellation of small satellites comprising:
   (a) detecting a first signal from a vehicle travelling along a vehicle travel path;
   (b) detecting an anomaly from the first signal;
   (c) determining whether the anomaly occurs (i) inside a first radar mode coverage area or (ii) outside the first radar mode coverage area;
   (d) activating (i) a first radar mode if the anomaly occurs inside the first radar mode coverage area to detect a second signal from the vehicle or (ii) a second radar mode if the anomaly occurs outside the first radar mode coverage area to detect a third signal from the vehicle;
   (e) cueing a third radar mode by the first and second radar modes to (i) refine the second signal or (ii) refine the third signal from the vehicle;
   wherein the steps of (a), (b), (c), (d) and (e) are sequentially performed by each satellite in the constellation of small satellites.

2. The method of claim 1, wherein the vehicle comprises non-distressed and distressed vehicles, wherein the distressed vehicles is/are vehicles detected with an anomaly.

3. The method of claim 1, further comprising sequencing the first, second and third radar modes repeatedly to simultaneously provide surveillance, positioning and tracking of all fast and slow moving vehicles with or without anomalies in the airspace, sea and land travel routes.

4. The method of claim 1, wherein the first signal comprises a transponder signal utilizing a cooperative technique comprising ADS-B and AIS system.

5. The method of claim 1, wherein the second signal comprises a coarse positioning of the vehicle utilizing a non-cooperative technique comprising a Low Frequency Wide Swath Radar.

6. The method of claim 1, wherein the third signal comprises a transponder signal and/or a Bistatic signal reflected from the vehicle utilizing a Passive Coherent Radar technique.

7. The method of claim 1, wherein refining the second and third signal comprising utilizing an active high resolution Microwave Imaging Radar to perform high resolution imaging and tracking of the vehicle.

8. The method of claim 1, wherein detecting an anomaly from the first signal comprises:
   (a) decoding the first signal;
   (b) checking the integrity of the first signal; and
   (c) deriving an outcome by comparing the expected positioning with the measured positioning of the first signal;
   wherein the detected anomaly is sent to the satellite which is closest to the area of the vehicle.

9. The method of claim 1, wherein activating the first radar mode comprises utilizing a Low Frequency Wide Swath Radar with on anomaly characteristics to re-indicate the coarse positioning of the vehicle.

10. The method of claim 1, wherein activating the second radar mode comprises activating a first gap filler mode or a second gap filler mode to detect the vehicle.

11. The method of claim 10, wherein activating the first gap filler mode comprises activating a Semi-Cooperative Technique to detect the third signal from the vehicle transponder, wherein the third signal is a false transponder signal indicated by the positioning data of the third signal being incoherent with the positioning data detectable from a fourth signal emitted by another onboard sensor from the vehicle.

12. The method of claim 10, wherein activating the second gap filler mode comprises activating a Passive Coherent Radar for receiving the opportunistic Bistatic signals, wherein the vehicle transponder is not transmitting.

13. The method of claim 12, wherein the Passive Coherent Radar comprises:
   a Passive multi-input, multi-output (MIMO) synthetic output radar (SAR) Imaging Radar configured to detect and locate the vehicle in a MIMO configuration; and
   a Passive HF Skywave Radar configured to receive the high frequency (HF) signals that bounced off the vehicles when they are illuminated by a global network of sea, land and airborne transmitting stations.

14. The method of claim 13, wherein the Passive MIMO SAR Imaging Radar re-utilizes signals of opportunities such as Automatic Dependent Surveillance-Broadcast (ADS-B) signals from multiple transmitting vicinity fast vehicles to illuminate the vehicle under tracking to provide the second gap filler mode when the distressed vehicle is outside the first radar mode coverage due to a sparse satellite constellation.

15. The method of claim 13, wherein the Passive HF Skywave Radar utilizes HF signals emitted from ground based transmitting stations to strike the ionosphere at the F2 layer at a low grazing angle between 10 degrees and 20 degrees and to detect the HF signals reflected from the vehicle at an incidence angle of 20 degrees or less.

16. The method of claim 13, wherein ground based transmitting stations comprises at least:
   a. HF Broadcasting Sites having a typical transmitting power of 500 KW with a transmitting gain of 20 dB, a beamwidth of 20 degrees and a transmitter efficiency of 70%;
   b. Relocatable Transmitting Sites over remote ocean areas such that 500 KW Broadcast HF transmitting systems can be deployed on ships or offshore oil/gas platforms; or
   c. Mobile Transmitting Sites such as the High Frequency Data Link ("HFDL") enabled aircrafts flying in the vicinity for which the reflected vehicle echoes from these illuminations are intercepted by the HF receiving satellite constellation.

17. The method of claim 1, further comprising employing a multilateration technique via a set of at least three satellites orbiting in a non-periodic spacing to check the integrity of the positioning provided by cooperative techniques utilizing an ADS-B or an AIS transponder.

18. The method of claim 7, wherein the Microwave Imaging Radar performs high resolution imaging operations in the C, X, Ku or Ka frequency spectrum.

19. The method of claim 2, further comprising halting the first, second and third radar modes sequencing if a distressed vehicle is imaged and activating an emergency sequence by the third radar mode to continuously tracked the distressed vehicle.

20. The method of claim 8, wherein the decoding utilizes PPM modulation for ADS-B and GMSK modulation for AIS.

21. The method of claim 1, wherein the third radar mode further comprises analyzing motions of a vehicle with anomaly by combining at least one of
   multiple hypothesis tracking matched to at least one kinematics of the vehicle to obtain an ISAR image of a dived trajectory/vehicle, and
   imaging to detect the positioning of a crash point or mid-air explosion of the vehicle by an Inverse SAR imaging technique.

22. The method of claim 21, wherein imaging to detect the positioning of a crash point or mid-air explosion of the vehicle comprises: utilizing
   an Inverse Synthetic Aperture Radar (ISAR) imaging process based on the angular and linear motions of the vehicle;
   Synthetic Aperture Radar imaging (SAR) imaging of the sea and land surfaces for suspicious disappearances such as a crash or an immediate floating debris; and
   combination of both the (a) ISAR and (b) SAR techniques.

23. The method of claim 1, wherein a second satellite in the constellation is automatically activated to track and provide positioning of the vehicle under the first and/or third radar modes when the first satellite has moved out of the first radar mode coverage area of the vehicle travel path, wherein the first satellite is automatically de-activated.

24. A system for acquiring, positioning and tracking of vehicles travelling in airspace, sea and land routes via a constellation of small satellites comprising:
   a first detecting means for detecting a first signal from a vehicle travelling along a vehicle travel path;
   a processing means for detecting an anomaly from the first signal and determining whether the anomaly occurs (i) inside a first radar mode coverage area or (ii) outside the first radar mode coverage area;
   a second detecting means for detecting a second signal from the vehicle under a first radar mode if the anomaly occurs inside the first radar mode coverage area;
   a third detecting means for detecting a third signal from the vehicle under a second radar mode if the anomaly occurs outside the first radar mode coverage area; and
   a fourth detecting means for (i) refining the second signal or (ii) refining the third signal from the vehicle under a third radar mode;
   wherein the first, second, third and fourth detecting means are sequentially activated to detect the first, second and third signals by each satellite in the constellation of small satellites.

25. The system of claim 24, wherein the vehicle comprises non-distressed and distressed vehicles, wherein the distressed vehicles is/are vehicles detected with an anomaly.

26. The system of claim 24, wherein the constellation of small satellites comprises at least three satellites comprising Nano-Satellites, Micro-Satellites or Mini-Satellites.

27. The system of claims 24, wherein each satellite further comprises:
   a wideband receiver for receiving electromagnetic (EM) waves and/or signals from either (i) transponder signals from the vehicles, or (ii) Bistatic echo signals reflected off the vehicles;
   a low frequency wide swath radar with a transceiver operating in the low frequency band of either HF, VHF or UHF for detecting a distressed vehicle when it has moved randomly from a last known position;

a high resolution Microwave Imaging Radar with a transceiver operating in the X-band microwave frequency for refining the positioning of the distressed vehicle using imaging functions;

a storage/buffer unit for transmitting vehicle information from each satellite to a master ground station, for example, directly or via a geo-sat com service;

a synchronization unit (time/frequency) for synchronizing of three radar modes; and a processor for operational control of the functional units and processing of information such as detecting first, second and third signals from the initial detection, decoding and verification of anomaly, first, second, third and fourth detecting means, as well as performing the vehicle imagery and distress/emergency classifications.

28. The system of claim 24, wherein the first detection means comprises an Automatic Dependent Surveillance-Broadcast (ADS-B) or an Automatic Identification System (AIS) operating in a cooperative system environment.

29. The system of claim 27, wherein the processing means comprises the processor for decoding and checking the integrity of the first signal.

30. The system of claim 24, wherein the second detection means comprises a Low Frequency Wide Swath Radar for detecting the second signal if the anomaly occurs inside the first radar mode coverage area.

31. The system of claim 24, wherein the second detection means further comprises a Passive Bistatic Coherent Radar for detecting the third signal reflected off the vehicle travelling outside the first radar mode coverage area.

32. The system of claim 31, wherein the third signal comprises Bistatic signals transmitted from opportunistic emitters which are reflected of the vehicle outside the first area of the vehicle travel path.

33. The system of claim 24, wherein the fourth detection means comprises a Microwave Imaging Radar for performing high resolution imaging operations in the C, X, Ku or Ka frequency spectrum.

34. The system of claim 24, wherein the first signal comprises a unique identification, positioning in x, y, z geographical coordinates, course, and velocity Vx, Vy, Vz of the vehicle.

35. The system of claim 24, wherein the satellite constellation is in a LEO orbit, wherein the small satellites are organized into three different aspect angles with respect to an area of the vehicle travel path.

36. The system of claim 27, wherein each of the satellite receivers are synchronized in frequency.

37. The system of claim 24, wherein each satellite in the constellation is deployed to provide a detection ground surveillance coverage gap between neighboring satellites corresponding to a satellite revisit time gap of two minutes.

38. The system of claim 24, wherein the third signal comprises signals of opportunity from Automatic Dependent Surveillance-Broadcast (ADS-B) operating at 1090 +/−3 MHz, AIS operating at 161,975 to 162,025 MHz, High Frequency Data Link (HFDL), frequency modulation (FM) Broadcast Emitters operating at 87.5 to 108.0 MHz, very high frequency (VHF) omnidirectional range (VOR) and distance measuring equipment (DME) VOR/DME Emitters operating at 108 to 117.95 MHz, Geostationary Satellite Emitters and Ground-based and Airborne Radars.

39. A method for surveillance, integrity check and tracking of vehicles travelling in an airspace, sea and land routes comprising:

detecting transponder signals from a plurality of vehicles using cooperative techniques;

a first step of checking the transponder signals for anomalies of a vehicle;

a second step of detecting a coarse positioning of a distressed vehicle; and a third step of refining the course positioning of the distressed vehicle, wherein the distressed vehicle is further tracked for search and rescue operations.

40. The method of claim 38, wherein the first step comprises:

decoding the transponder signals;

checking the integrity of the transponder signals using a multilateration technique; and detecting an anomaly from the transponder signals, wherein a vehicle with a positioning data anomaly is a vehicle in distress.

41. The method of claim 40, wherein the checking the integrity of the transponder signals comprises a multilateration technique comprising:

Implementing Frequency Difference Of Arrival (FDOA) or Time Difference Of

Arrival (TDOA) from a set of at least 3 satellites for measuring either differential Doppler frequencies and/or differential time of arrivals of the transponder signals;

Computing either differential Doppler frequencies or differential time of arrival or both from the positioning data provided by the cooperative positioning system (transponder under ADS-B or AIS protocol); and Computing the difference between the measurements and the computed values to provide an integrity classification comprising a "True", "False" or "Unclassified" category.

42. The method of claim 39, wherein the second step comprises detecting the coarse positioning of a distressed vehicle using a Wide Swath Radar if the distressed vehicle is within the Wide Swath Radar coverage.

43. The method of claim 39, wherein the second step comprises detecting a distressed vehicle using a Passive Coherent Radar if the distressed vehicle is outside the Wide Swath Radar coverage.

44. The method of claim 43, wherein the second step further comprises a first Gap Filler mode of detecting a distressed vehicle with spoofed transponder using a Semi-Cooperative technique.

45. The method of claim 43, wherein the second step further comprises a second Gap Filler mode of detecting a distressed vehicle using (i) multi-input, multi-output (MIMO) synthetic output radar (SAR) Imaging Radar or (ii) Passive HF Skywave Radar for detecting bistatic signals if the transponder is not detectable.

46. The method of any of claims 39, wherein the third step of refining the coarse positioning of the distressed vehicle comprises using a Microwave Radar to further accurately track the distressed vehicle for search and rescue operations.

47. The method of claim 39, wherein the ground area covered by the:

first step ranges from a diameter of 2000-3000 km of a circumscribed circle based on semi-cooperative mode;

second step ranges from a diameter of 1100-1600 km of a circumscribed circle based on a non-cooperative mode; and third step ranges from a diameter of up to 700 km of a circumscribed circle based on a non-cooperative mode.

\* \* \* \* \*